United States Patent
Eskafi et al.

(10) Patent No.: US 11,134,215 B2
(45) Date of Patent: Sep. 28, 2021

(54) ONLINE ENCOUNTER ENHANCEMENT SYSTEMS AND METHODS

(71) Applicant: 11Sight, Inc., El Cerrito, CA (US)

(72) Inventors: Farokh Hassanzadeh Eskafi, San Jose, CA (US); Aleks Channes Gollu, El Cerrito, CA (US)

(73) Assignee: 11SIGHT, INC., El Cerrito, CA (US)

( * ) Notice: Subject to any disclaimer, the term of this patent is extended or adjusted under 35 U.S.C. 154(b) by 0 days.

(21) Appl. No.: 17/191,327

(22) Filed: Mar. 3, 2021

(65) Prior Publication Data
US 2021/0195141 A1   Jun. 24, 2021

Related U.S. Application Data

(63) Continuation-in-part of application No. 16/543,558, filed on Aug. 18, 2019.

(60) Provisional application No. 62/720,123, filed on Aug. 21, 2018.

(51) Int. Cl.
| | |
|---|---|
| *H04L 12/58* | (2006.01) |
| *H04N 7/14* | (2006.01) |
| *G10L 17/22* | (2013.01) |
| *G06F 21/32* | (2013.01) |

(52) U.S. Cl.
CPC .......... *H04N 7/147* (2013.01); *G06F 21/32* (2013.01); *G10L 17/22* (2013.01); *H04L 51/10* (2013.01); *H04L 51/12* (2013.01)

(58) Field of Classification Search
None
See application file for complete search history.

(56) References Cited

U.S. PATENT DOCUMENTS

| | | | | |
|---|---|---|---|---|
| 5,125,022 | A | * 6/1992 | Hunt | H04M 3/382 379/88.02 |
| 6,144,723 | A | * 11/2000 | Truchon | H04M 3/42 379/114.01 |
| 7,532,232 | B2 | 5/2009 | Shah et al. | |
| 8,326,964 | B1 | 12/2012 | Chourey et al. | |
| 8,688,701 | B2 | 4/2014 | Ghosh et al. | |
| 8,861,707 | B2 | 10/2014 | Beckett, II et al. | |
| 8,890,919 | B2 | 11/2014 | Fussy | |
| 8,924,482 | B2 | 12/2014 | Goldsmith | |
| 9,794,514 | B1 | * 10/2017 | Yoakum | G06F 3/165 |
| 9,883,042 | B1 | 1/2018 | Brown et al. | |
| 9,900,227 | B2 | 2/2018 | Liao et al. | |
| 9,904,712 | B2 | 2/2018 | Ritchey et al. | |
| 10,127,574 | B2 | 11/2018 | Brown et al. | |
| 10,182,720 | B2 | 1/2019 | Hennessey et al. | |

(Continued)

OTHER PUBLICATIONS

Ezuce, "Need to have a whisper conversation in your next video conferenc?", Jan. 8, 2016.*

*Primary Examiner* — Kenny S Lin
(74) *Attorney, Agent, or Firm* — Adam L. K. Philipp; Jonathan E. Olson; AEON Law

(57) ABSTRACT

Computing systems and methods are described in which video calls or other online communications are established or enhanced among two or more live participants. In some variants one or more preferences are gleaned from a first participant's behavior so as to streamline a call establishment with one or more qualified recipients. Alternatively or additionally, enriched auditory message data may be received privately from a sender without leaving a shared space.

18 Claims, 12 Drawing Sheets

(56) References Cited

U.S. PATENT DOCUMENTS

| | | |
|---|---|---|
| 10,237,412 B2 * | 3/2019 | Pilli .................... H04L 65/403 |
| 10,242,032 B2 | 3/2019 | Sundaresan et al. |
| 10,776,073 B2 | 9/2020 | Lenke et al. |
| 10,791,409 B2 | 9/2020 | Norris et al. |
| 10,819,950 B1 | 10/2020 | Lichtenbert et al. |
| 10,872,322 B2 | 12/2020 | Siddique et al. |
| 2006/0165018 A1 * | 7/2006 | Gierach ................ H04M 3/568 370/261 |
| 2008/0101575 A1 * | 5/2008 | Amador ............ H04M 3/42187 379/202.01 |
| 2009/0225971 A1 * | 9/2009 | Miller ............... H04M 3/42153 379/202.01 |
| 2014/0280490 A1 | 9/2014 | Artun |
| 2015/0189227 A1 | 7/2015 | Du et al. |
| 2015/0324946 A1 | 11/2015 | Arne et al. |
| 2016/0021207 A1 | 1/2016 | Dingwall et al. |
| 2016/0219085 A1 * | 7/2016 | Jacobson ............ H04L 41/5064 |
| 2017/0300882 A1 | 11/2017 | Crooks |
| 2018/0139413 A1 * | 5/2018 | Diao .................... H04L 65/601 |
| 2018/0343135 A1 | 11/2018 | Cheung et al. |
| 2019/0026122 A1 | 1/2019 | Wang et al. |

\* cited by examiner

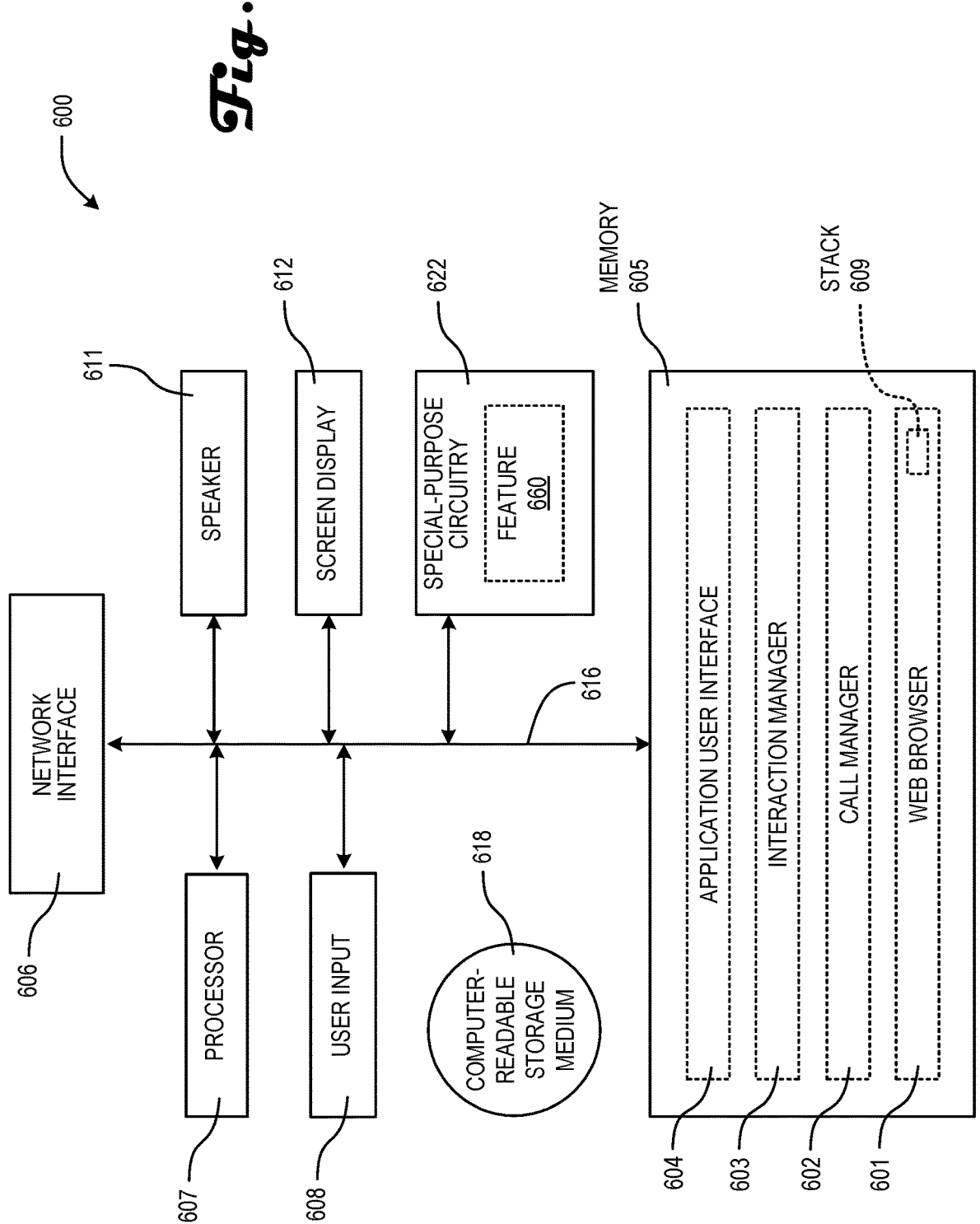

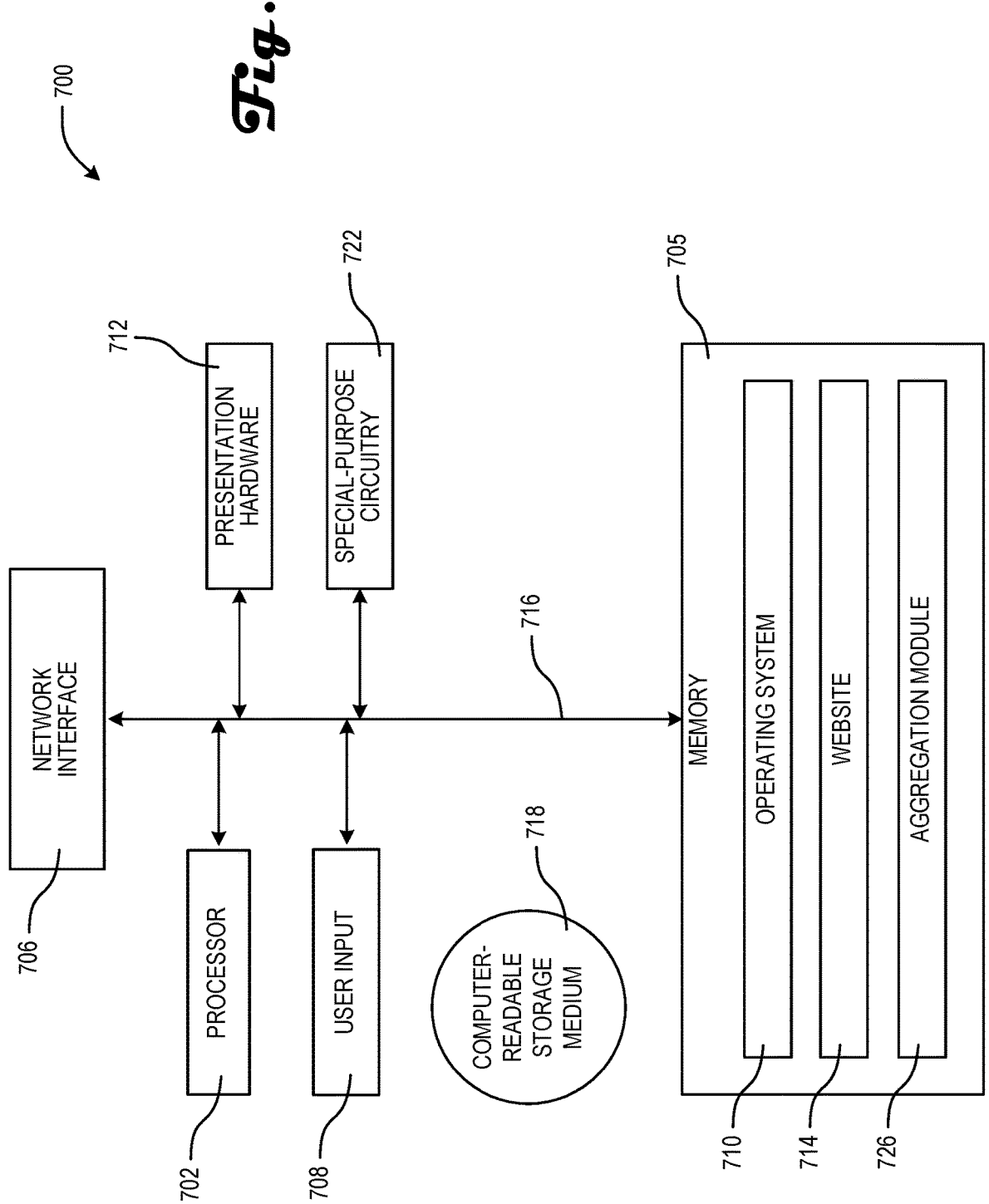

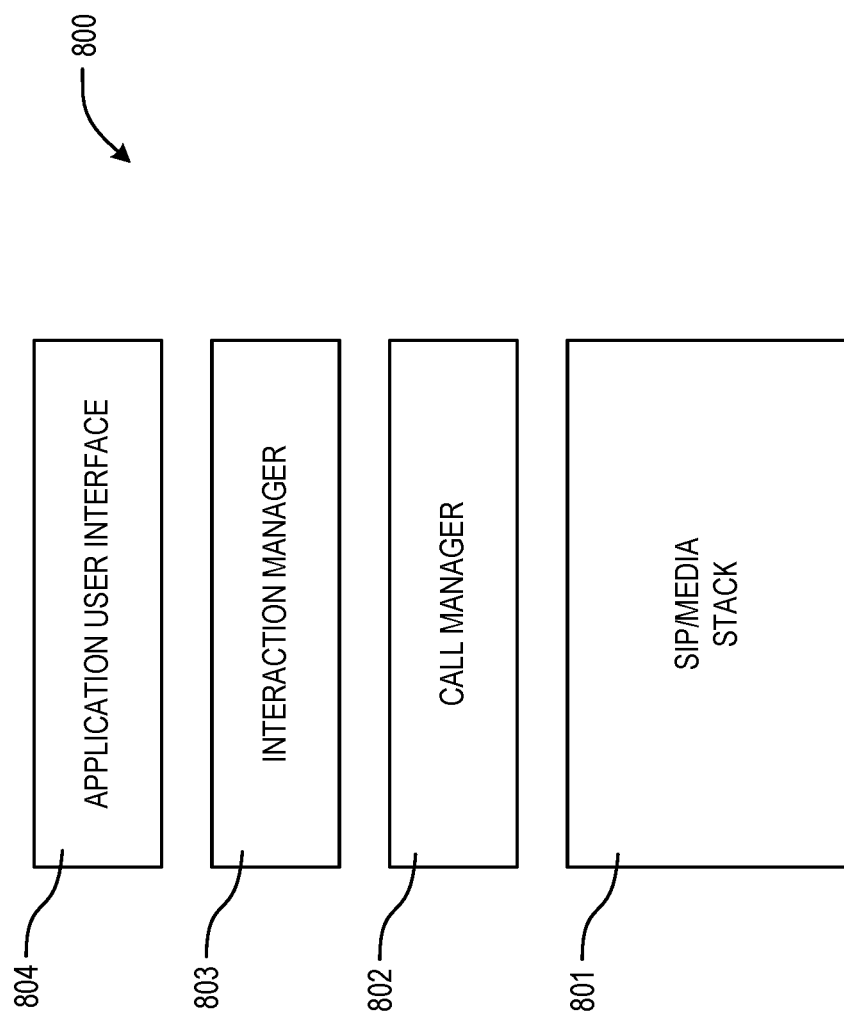

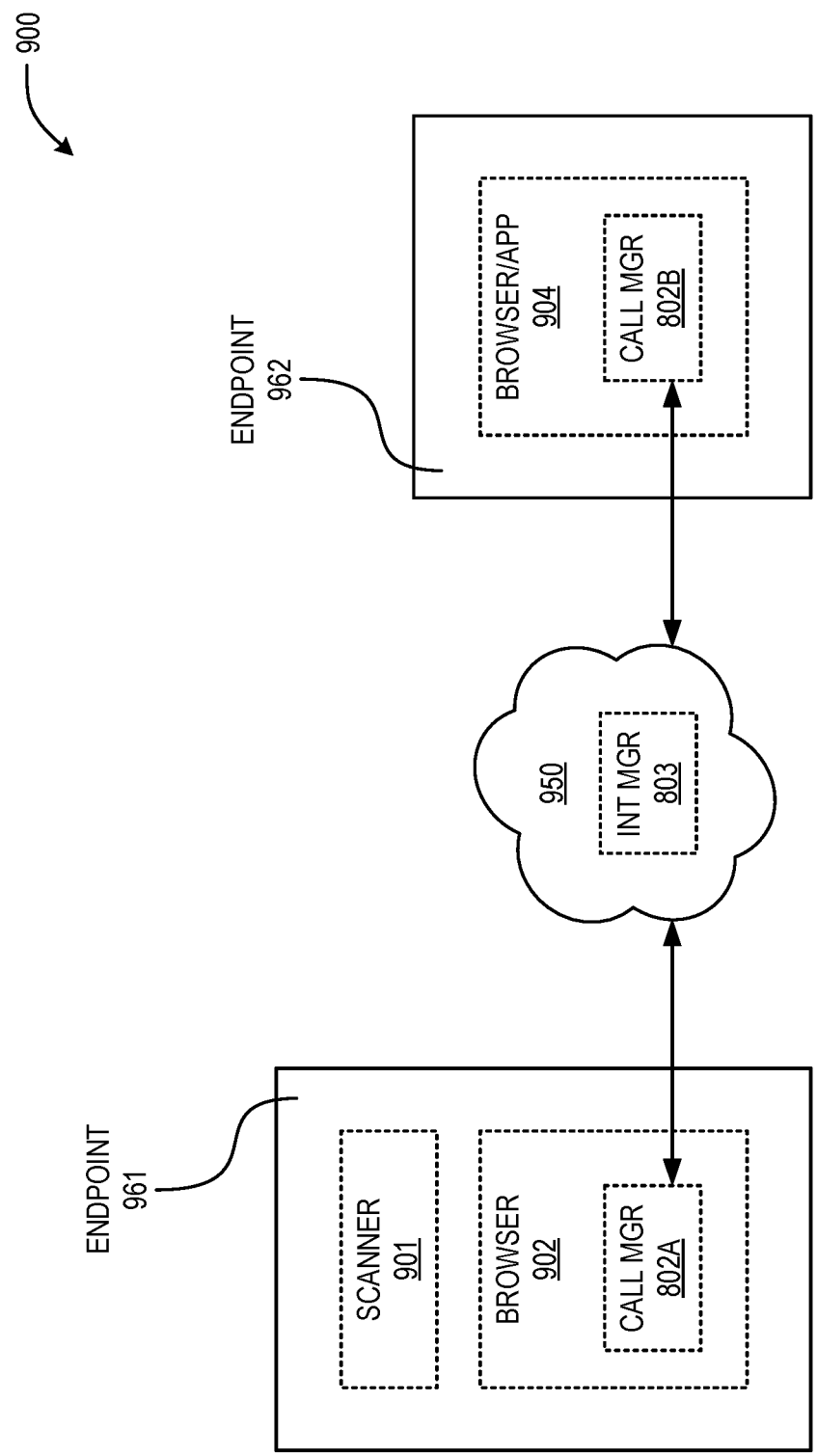

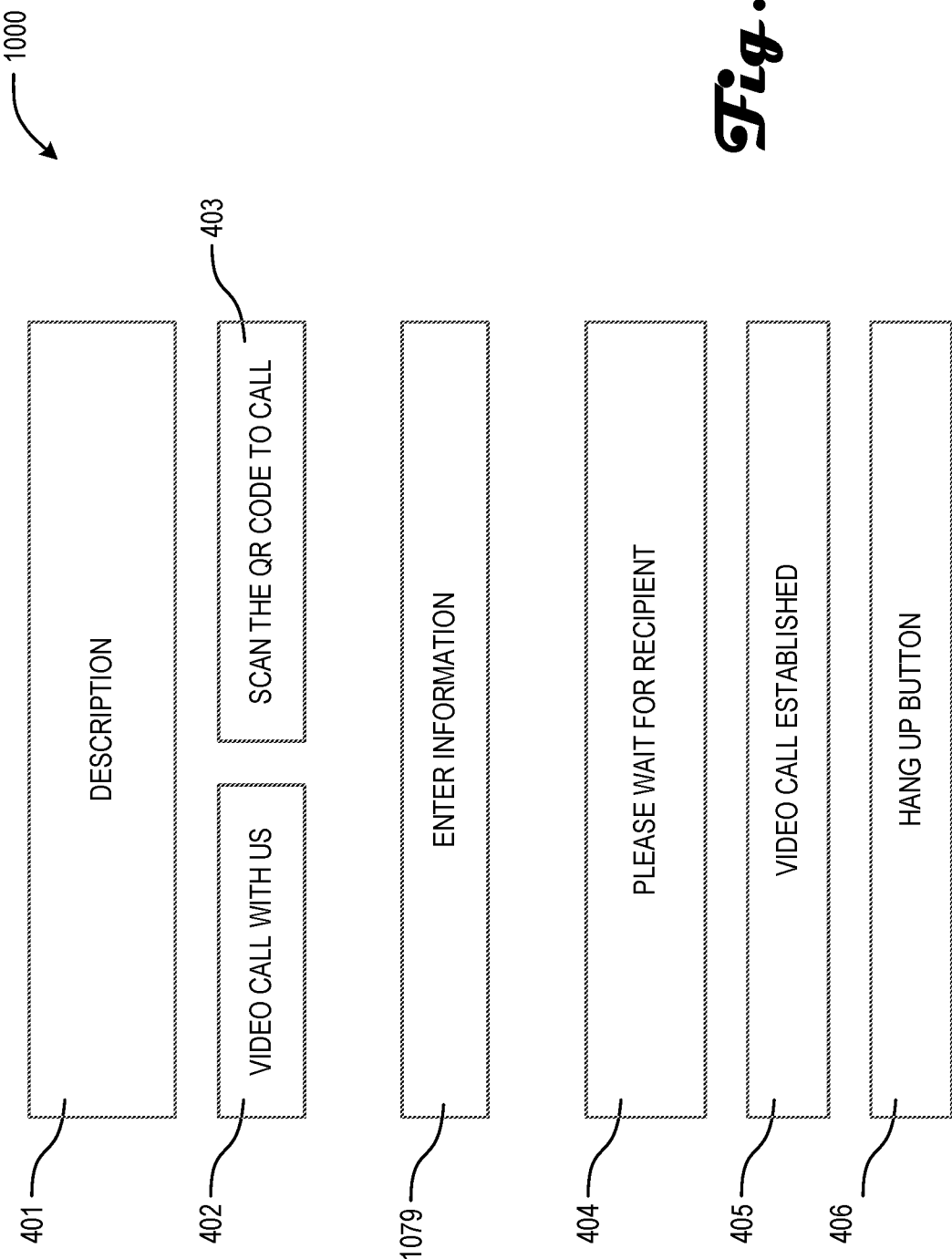

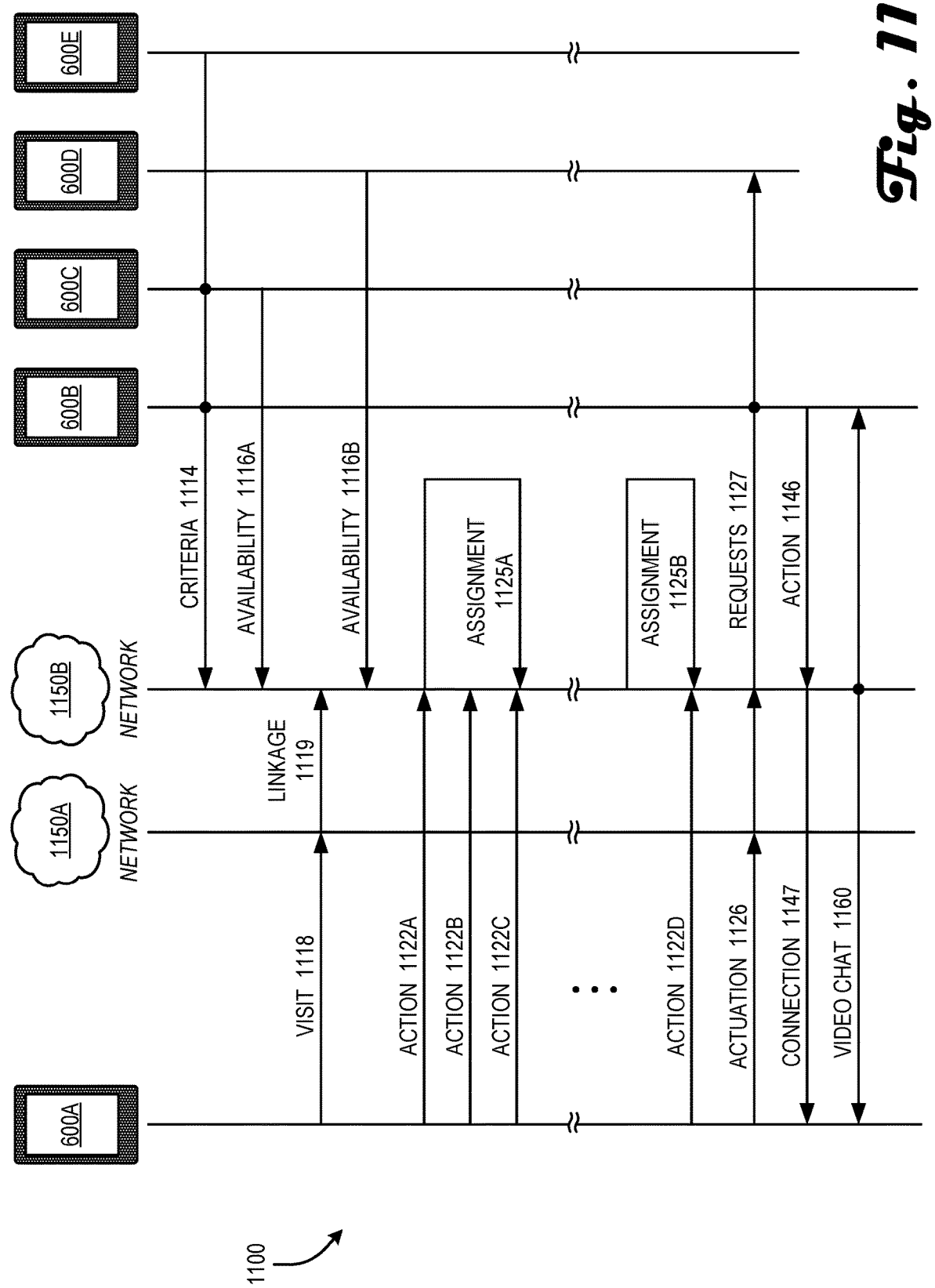

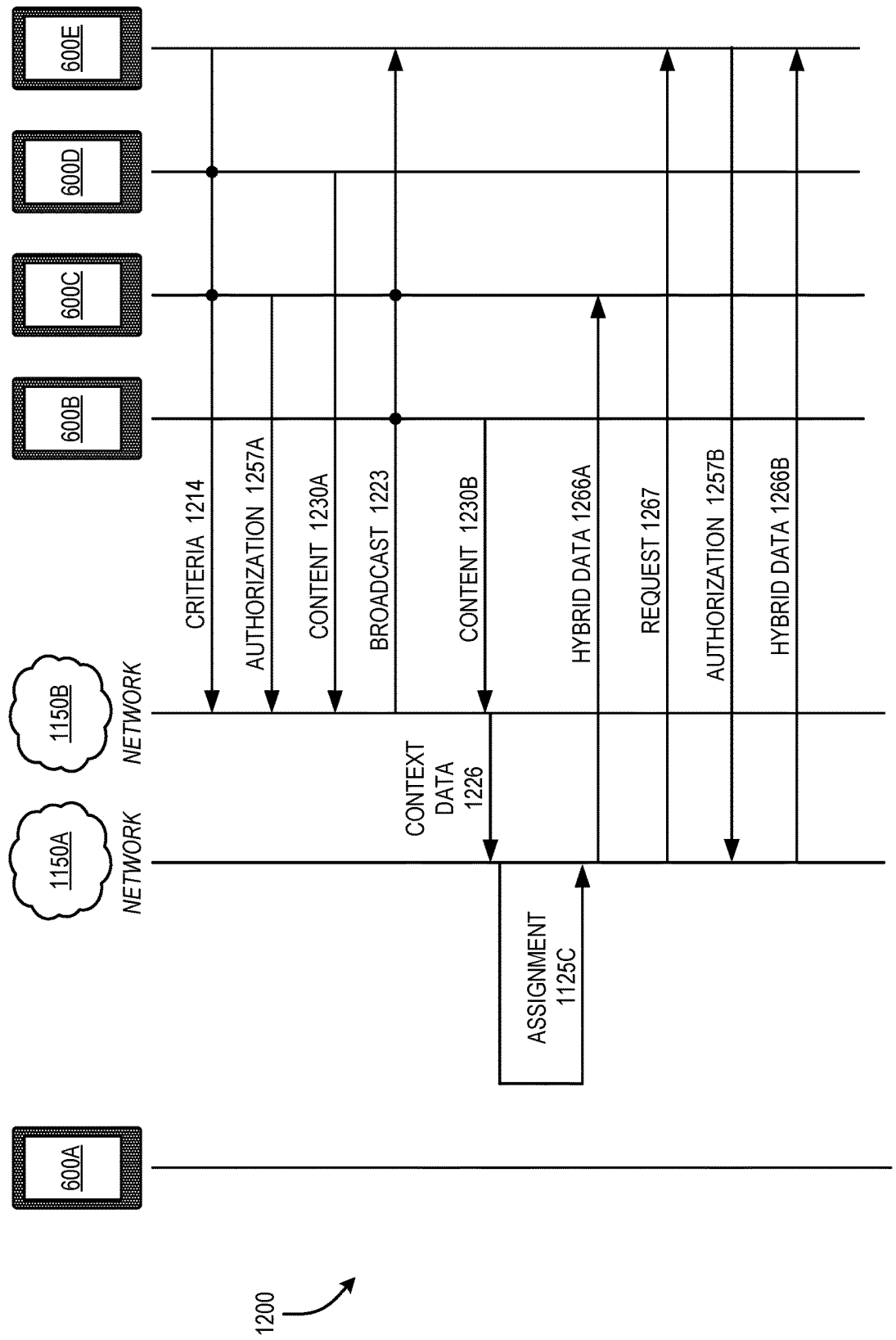

ONLINE ENCOUNTER ENHANCEMENT SYSTEMS AND METHODS

RELATED APPLICATIONS

This application is a continuation-in-part of U.S. application Ser. No. 16/541,558 ("Methods and Systems for Placing a Video Call Over a Communication Network"), which is incorporated herein by reference in its entirety for all purposes.

BRIEF DESCRIPTION OF THE DRAWINGS

FIG. 6 depicts a client device in which one or more improved technologies may be incorporated.

FIG. 7 depicts a server in which one or more improved technologies may be incorporated.

FIG. 8 depicts an application stack in which one or more improved technologies may be incorporated.

FIG. 9 depicts a system in which another network allows various communications at least between two endpoints in which one or more improved technologies may be incorporated.

FIG. 10 depicts another block diagram of a single-action video call in which one or more improved technologies may be incorporated.

FIG. 11 depicts a flow diagram in which one or more improved technologies may be incorporated.

FIG. 12 depicts another flow diagram in which one or more improved technologies may be incorporated.

DETAILED DESCRIPTION

Figure 1:
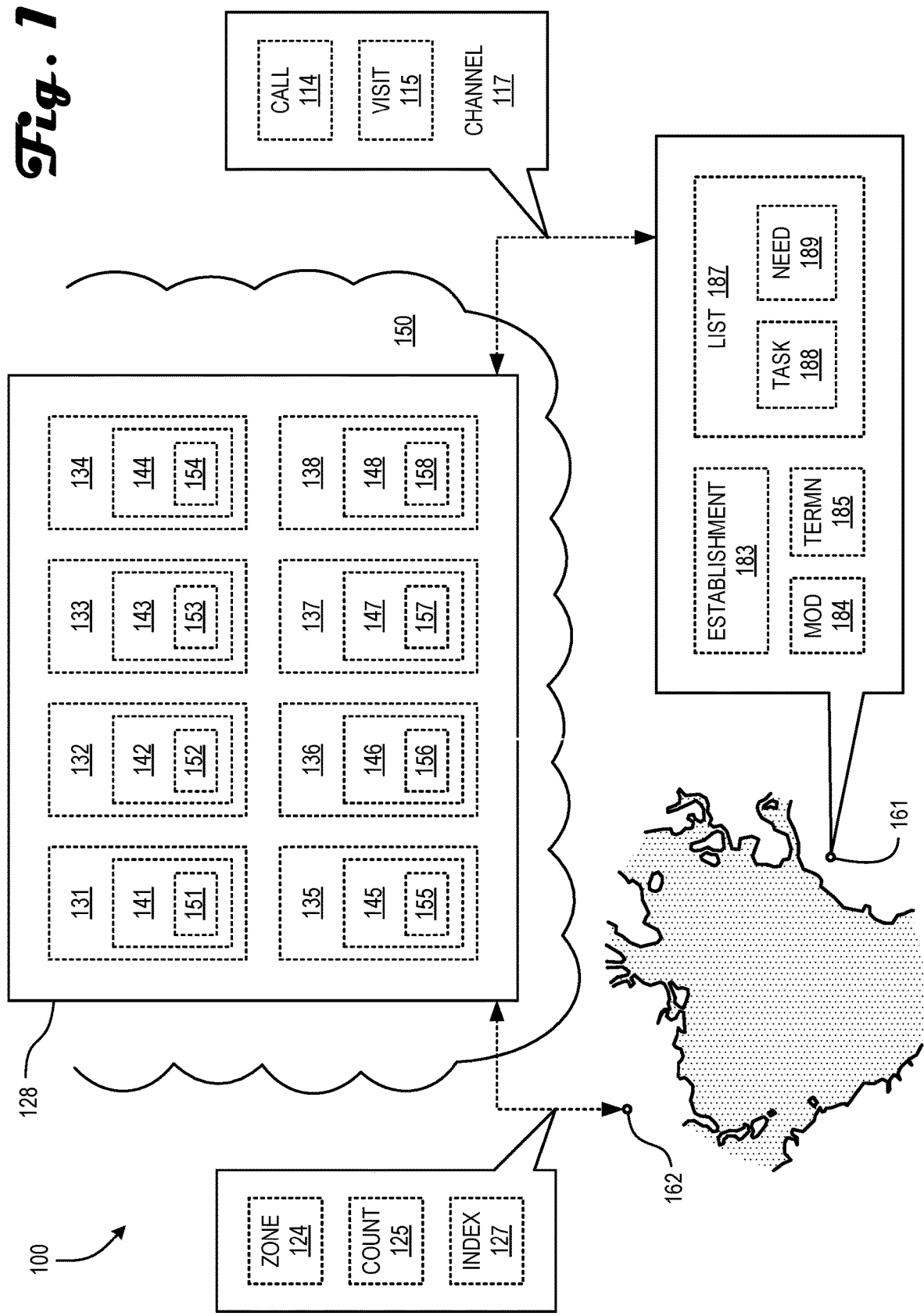
FIG. 1 depicts a transatlantic arrangement of one or more systems in which one or more improved technologies may be incorporated.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. "Additional," "after," "application-specific," "associated," "at least," "auditory," "authorized," "automatic," "based," "before," "component," "comprising," "communication," "configured," "connected," "corresponding," "defined," "eligible," "excluded," "expressed," "facilitated," "first," "identified," "immediate," "implemented," "in," "indicative," "interpersonal," "invoked," "natural," "manifested," "new," "obtained," "of," "other," "particular," "partly," "private," "selective," "such," "permitted," "prospective," "public," "qualified," "remote," "responsive," "second," "simultaneous," "signaled," "so as," "special-purpose," "third," "targeted," "temporary," "transmitter-side," "triggered," "unique," "wherein," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Numerous" as used herein refers to more than one dozen. "Instantaneous" as used herein refers to having a duration of less than 0.1 seconds unless context dictates otherwise. "Immediate" as used herein refers to having a duration of less than 5 seconds unless context dictates otherwise. Circuitry or data items are "onboard" as used herein if they are aboard a vehicle or denoting or control 109led from a facility or feature incorporated into the main circuit board of a computer or computerized device unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates one or more distributed or other data-handling system 100 configured to facilitate trans-oceanic monitoring and comprising transistor-based circuitry 128 in one or more data networks 150, in which one or more technologies may be implemented. In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any session parameters or other informational data identified herein may easily be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device 600 or other system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 128 may comprise one or more integrated circuits (ICs), for example, optionally mounted on one or more circuit boards. Whether implemented in a distributed cloud or within one or more (apparatuses at) endpoints described herein, transistor-based circuitry 128 comprises an event-sequencing structure generally as described in U.S. Pat. Pub. No. 20150094046 but configured as described herein. Transistor-based circuitry 128 may (optionally) include one or more instances of control components 131 configured for local processing, for example, each including an electrical node set 141 upon which one or more operational parameters described herein are represented digitally as a corresponding voltage configuration 151. Transistor-based circuitry 128 may likewise include one or more instances of response components 132 configured for local processing, for example, each including an electrical node set 141 upon which one or more criteria described herein are represented digitally as a corresponding voltage configuration 152. Transistor-based circuitry 128 may (optionally) include one or more instances of routing components 133 configured for local processing, for example, each including an electrical node set 141 upon which one or more data destinations described herein are represented digitally as a corresponding voltage configuration 153. Transistor-based circuitry 128 may likewise include one or more instances of notification components 134 configured for local processing, for example, each including an electrical node set 141 upon which one or more messages described herein are represented digitally as a corresponding voltage configuration 154. Transistor-based circuitry 128 may likewise include one or more instances of invocation components 135 configured for delegation or other distributed processing, for example, each including an electrical node set 141 upon which one or more memory addresses described herein are represented digitally as a corresponding voltage configuration 155. Transistor-based circuitry 128 may (optionally) include one or more instances of recognition components 136 configured for local processing, for example, each including an electrical node set 141 upon which one or more patterns as described herein are represented digitally as a corresponding voltage configuration 156. Transistor-based circuitry 128 may likewise include one or more instances of authorization components 137 configured for local processing, for example, each including an electrical node set 141 upon which one or more contingent response described herein are represented digitally as a corresponding voltage configuration 157. Transistor-based circuitry 128 may likewise include one or more instances of interface components 138 configured for local processing, for example, each including an electrical node set 141 upon which one or more queries or other prompts described herein are represented digitally as a corresponding voltage configuration 158. In some variants, for example, a server or other endpoint 162 in North America may manifest an instance of a communication channel from a connection-initiating endpoint 161 (e.g. a client device, hub, or user 10 in North Africa) featuring one or more instances of circuitry components like these. Data flow diagrams and other structures describing such channels 117 are provided below.

In some variants an establishment 183, modification 184, or termination of a call 114, visit 115, or other online interaction via channel 117 is described below. Moreover interpersonal communications may arise organically from one or more (instances of) tasks 188, needs 189, or other items on a list 187 of a client device user at a first endpoint 161 as shown. In some contexts, for example, a user's time or activities within a virtual reality zone 124 may be monitored to result in one or more counts 125 or other indexes 127 that characterize a user's interest in a topic without needing to query the user and wait for a result. Alternatively or additionally users in an online conference zone 124 (with one or more users at one or more respective additional endpoints 162) may experience more sophisticated modes of interpersonal communication than were ever possible even in real life.

Figure 2:
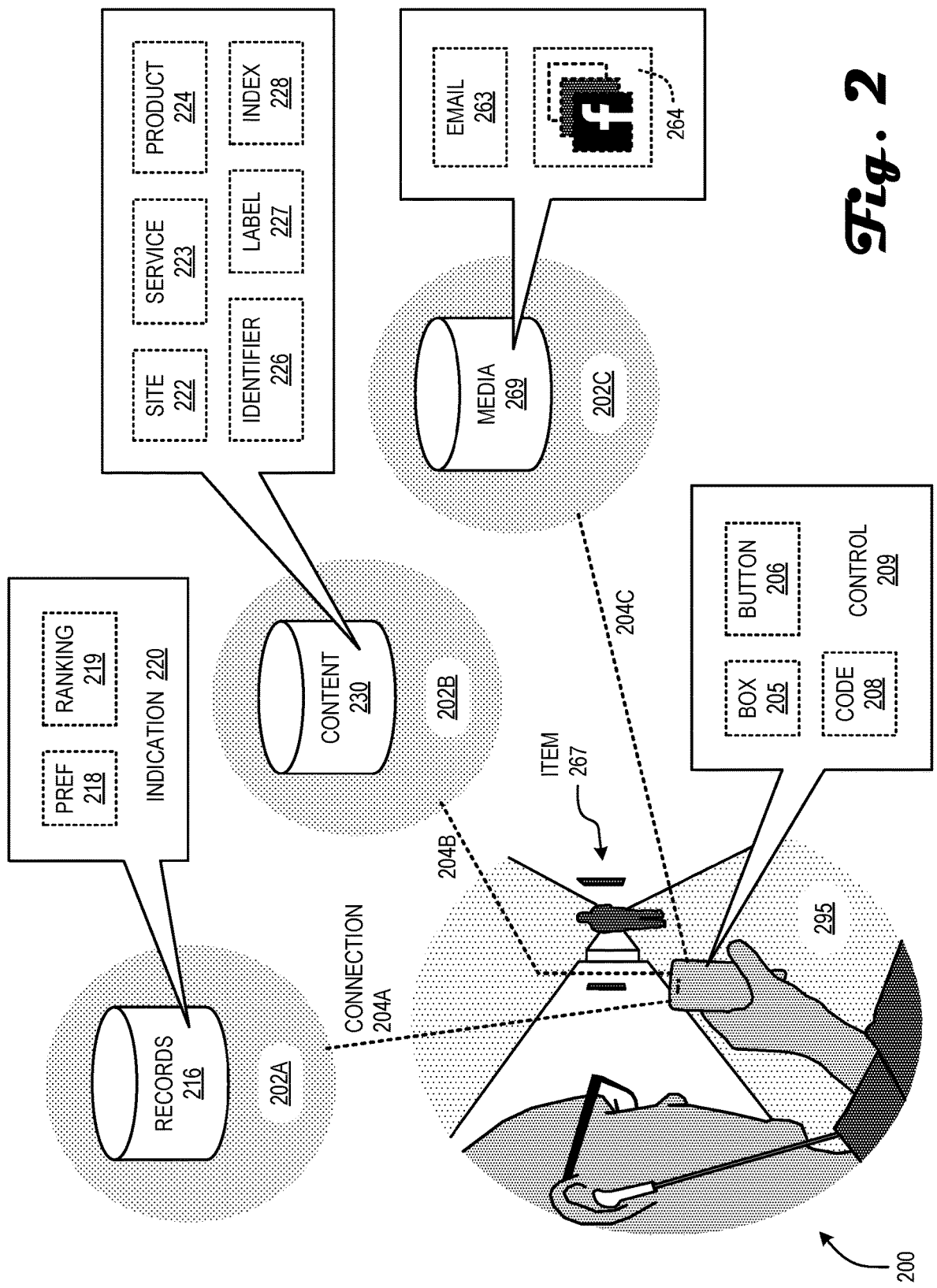
FIG. 2 depicts a physical proximity of a mobile device user who can initiate and modify an interpersonal communication in which one or more improved technologies may be incorporated.

FIG. 2 depicts a physical proximity 295 of a user of a mobile device at a first endpoint 161 featuring one or more on-screen boxes 206, buttons 206, codes 208, or other controls 209 in which one or more technologies may be implemented to initiate an interpersonal communication (e.g. a single-action video call 114). Alternatively or additionally in some variants the device may be configured to read (through one or more cameras and other interfaces) printed media items 267 (e.g. placards or business cards) that are configured to trigger a video call 114 for consultation in regard to a topic of interest (e.g. with a docent in regard to an artwork on display) as shown.

To pinpoint and enrich suitable interpersonal consultations, one or more response components 132 may be configured to monitor and update topical indexes 127 according to which of several electronic resources 202A-C are accessed prior to the triggering of the interpersonal communication. This can occur, for example, in a context in which a preference 218, ranking 219, or other indication 120 can be gleaned according to how much time or how many records 216 or other resources 202A were reviewed via a first connection 204A; in which an online site 222, service 223, product 224, skill identifier 226, label, index 228, or other such content 230 is associated with a second section of online resources 202B reviewed via a second metered connection 204B; in which repository of email 263 or social media 265 or other such media 269 is associated with a third section of online resources 202C reviewed via a third metered connection 204C; and in which two or more such sectioned resources 202A-C are each respectively associated with an appropriate specialist of exceptional skill in that respective resource. As described below a single-action button 206, link, a single-action QR code 208, or other such customized controls 209 as described below.

Figure 3:
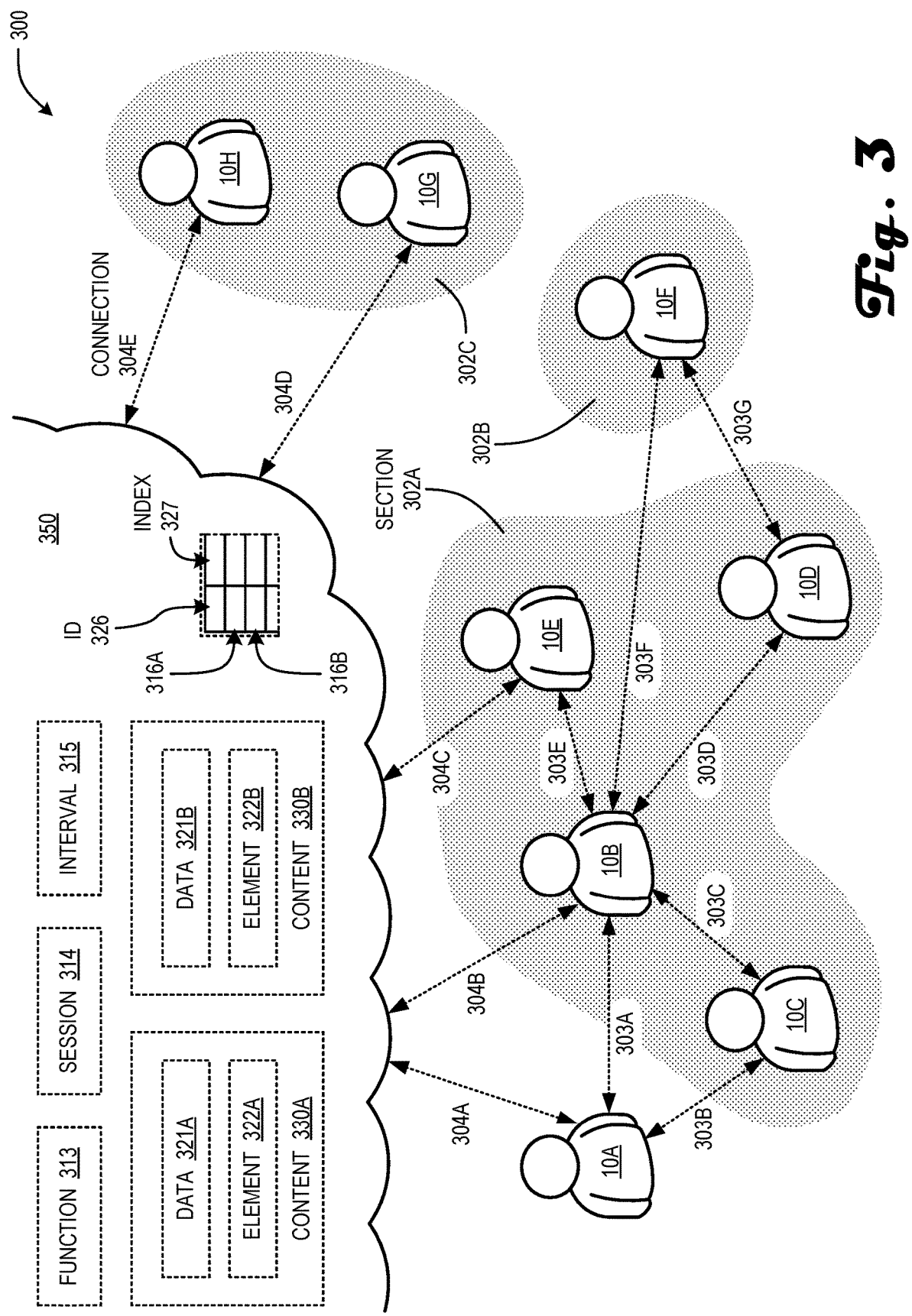
FIG. 3 depicts a network that can facilitate interpersonal message component deliveries within a section or across section boundaries in which one or more improved technologies may be incorporated.

FIG. 3 schematically illustrates a data-handling system 300 that may connect with or instantiate the above-described systems 100, 200. A network 350 thereof may likewise connect with or instantiate network 150 or include one or more instances of resource 202A, of resource 202B, of resource 202C, or of more than one of these. As further described below, network 350 may include, determine, or otherwise facilitate one or more (instances of) functions 313, sessions 314, intervals 315, of auditory data 321A with associated elements 322A comprising content 330A, of auditory data 321B with associated elements 322B comprising content 330B, of records 316A-B that each associate one or more identifiers 326 with one or more indexes 327.

In some contexts a crowd of multiple users 10A-H may each belong at a given moment to zero, one or more subsets or other sections 302A-C as shown and further described below. Some or all such users 10A-H may have a connection 304A-E with a network 150, 350 or may have peer-to-peer connections or other bilateral or other relationships 303A-G among them in contexts, of a trial courtroom, a consultant community, a concert or festival, a marketplace, a classroom, a virtual reality or augmented reality contest, or some other complex and needful interpersonal gathering in which some or all users 10A-H may want to interact online in a controllable, appropriate, and selective manner.

Figure 4:
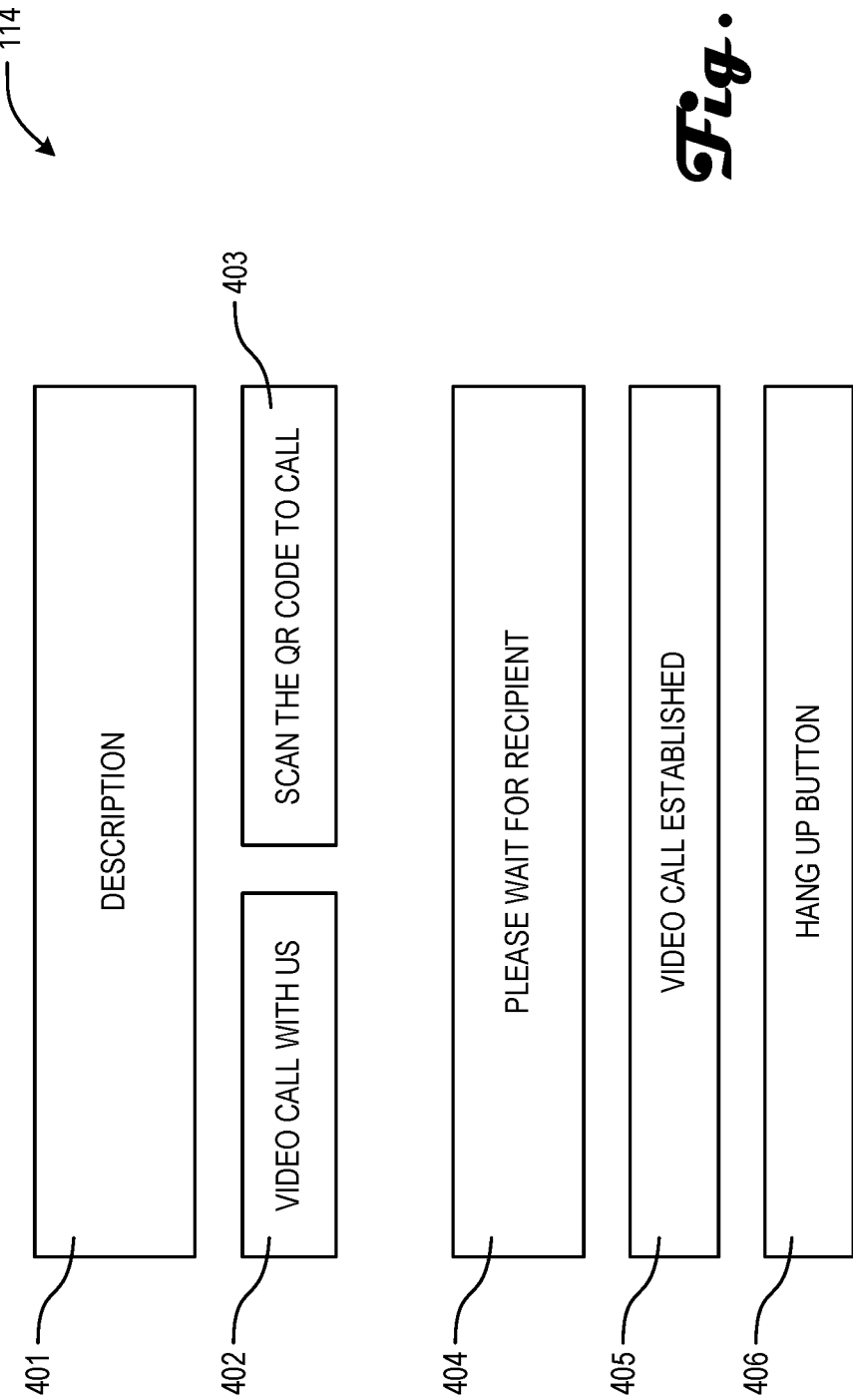
FIG. 4 depicts a block diagram of a single-action video call in which one or more improved technologies may be incorporated.

FIG. 4 schematically depicts a block diagram of a single-action video call 114 according to one or more embodiments. In this protocol a patient or other needful user 10A will see a textual or other description 401 pertaining to one or more consultants or other potential providers. A notification 405 like "VIDEO CALL ESTABLISHED" and one or more faces of call-receiving entities (e.g. users 10B-H) are immediately presented in a quick response video conference. In some variants in which transmitting user 10A has a video camera available for use, a call-receiving entity also sees user 10A (provided that user 10A has chosen to enable the camera). The calling user 10A and the call-receiving user(s) each include an interface having a hang up button 206, 406 or similar control 209 that allows them to terminate the (call 114 or other) session 314.

Figure 5:
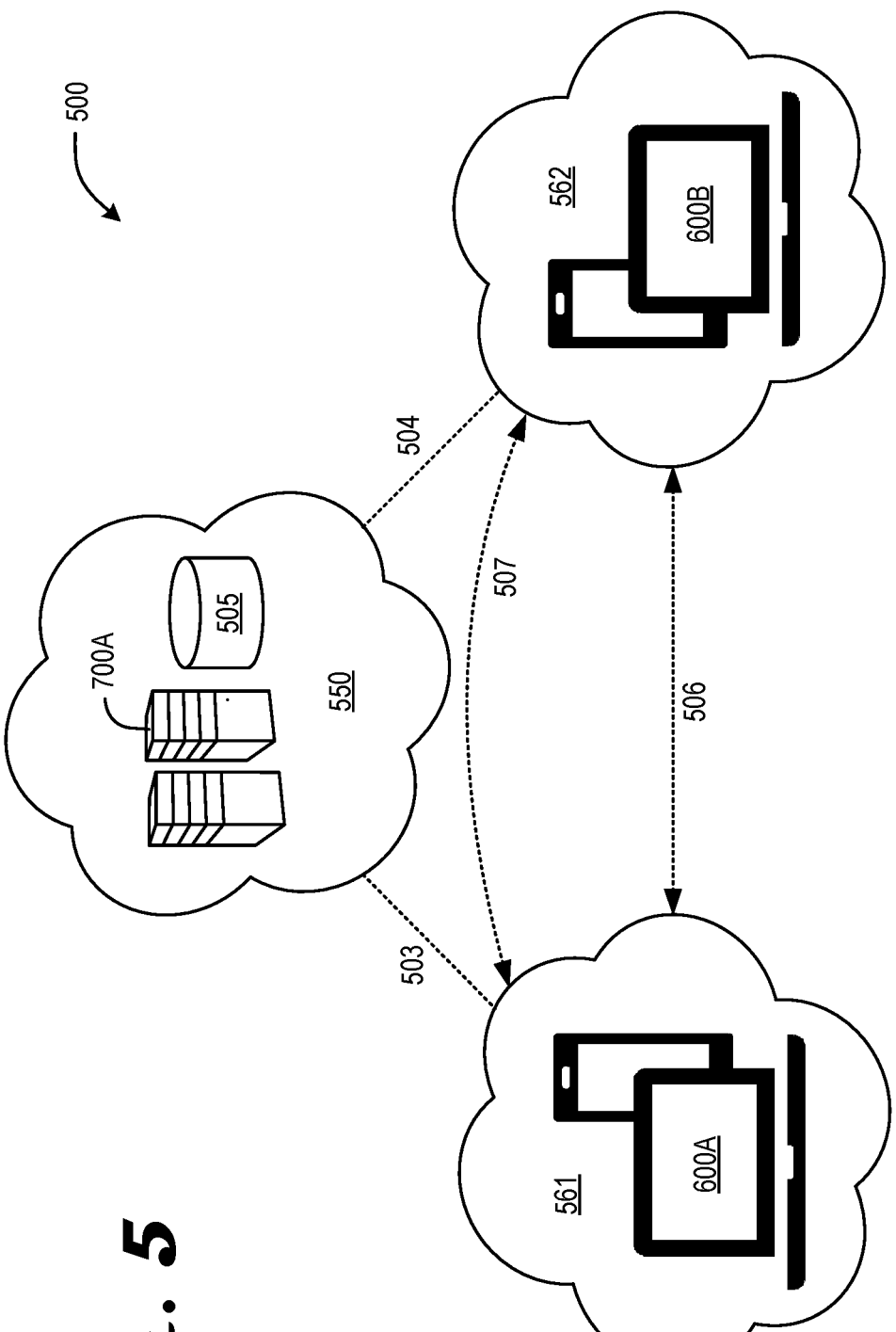
FIG. 5 depicts a system in which a network allows various communications at least between two endpoints in which one or more improved technologies may be incorporated.

FIG. 5 schematically depicts a system 500 in which a network 550 allows various calls 114 or other session 314 described herein according to one or more embodiments. In some variants endpoints 561, 562 may connect directly via a peer-to-peer signal path 506. Alternatively or additionally endpoints 561, 562 as shown may connect directly via one or more networks 350, 550 incorporating one or more connection servers 700A. Such servers might be hosted in the cloud or in a local instances operated by user 10B. Control channels 117 in network 550, for example, may manage call establishments 183, intermissions, reconnections or other modifications 184, and terminations 185 according to one or more embodiments. In some variants, a user-selected label 227 or other digital expression of an intention of user 10A to initiate a video call 114 to one or more suitable recipients (e.g. at one or more endpoint devices 502) is relayed via linkage 503 to the connection server 700 that has a subscriber database 505. A subscriber database 505 holds the network location and IP address of the receiver endpoint 532 and notifies the receiver endpoint 532 via linkage 504 of a session request 1127 (e.g. to connect via video). If receiver endpoint 532 accepts a video call 114 or other session 314, then connection server 700 establishes an appropriate connection 204, 304 (e.g. via a peer-to-peer path 506 or via a connection server signal path 507). Endpoints 561, 562 as shown may (optionally) comprise a browser in a computer system 100, 200, 300, 500 or a mobile smartphone or an app in a smartphone system 100, 200, 300, 500. In some variants a browser/app are each capable of establishing a video connection 204, 304.

FIG. 6 schematically depicts a (smartphone or other) computing device with an application configured to initiate or otherwise facilitate a single-action call 114 according to some variants. In one embodiment, a computer with a browser stack 609 has the following components. It has a browser with WebRTC stack or equivalent 601 which allows video streams to be encoded and decoded. It has a call manager 602 which coordinates the control messages to and from the connection server 700. It has an interaction manager 603 that coordinates interaction of a first user 10A via the stack with another user 10B-H. It has an Application User 10A Interface (UI) 604 that enables the interaction of the first user 10A with the video call 114.

Referring now to FIG. 6, there is shown a client device 600 in which one or more technologies may be implemented. Client device 600 may include one or more instances of processors 602, of memories 605, of user inputs 608, of (speakers 611 or screen displays 612 or other local) presentation hardware all interconnected along with the network interface 606 via a bus 616. One or more network interfaces 606 allow device 600 to connect via the Internet or other networks 150). Memory 605 generally comprises a random-access memory ("RAM"), a read only memory ("ROM"), and a permanent mass storage device, such as a disk drive.

Memory 605 may contain one or more instances of operating systems 610, of web browsers 614, of other local apps 624, or of other modules that facilitate operations described herein. These and other software components may be loaded from a non-transitory computer readable storage medium 618 into memory 605 of the client device 600 using a drive mechanism (not shown) associated with a non-transitory computer readable storage medium 618, such as a floppy disc, tape, DVD/CD-ROM drive, flash card, memory card, or the like. In some embodiments, software or other digital components may be loaded via the network interface 606, rather than via a computer readable storage medium 618. Special-purpose circuitry 622 (implementing a security feature 660, e.g.) may, in some variants, include some or all of the event-sequencing logic described herein. In some embodiments client device 600 may include many more components than those shown in FIG. 6, but it is not necessary that all conventional components of a mobile device be shown in order to disclose an illustrative embodiment.

Referring now to FIG. 7, there is shown a server 700 in which one or more technologies may be implemented. Server 700 may include one or more instances of processors 702, of memories 705, user inputs 708, and of (speakers or other) presentation hardware 712 all interconnected along with the network interface 706 via a bus 716. One or more network interfaces 706 allow server 700 to connect via the Internet or other networks 150). Memory 705 generally comprises a random-access memory ("RAM"), a read only memory ("ROM"), and a permanent mass storage device, such as a disk drive.

Memory 705 may contain one or more instances of operating systems 710, of websites 714, of aggregation modules 726, or of preference implementation services or other such control 109 modules that facilitate modeling the preferences of a user/client. These and other software components may be loaded from a non-transitory computer readable storage medium 718 into memory 705 of the server 700 using a drive mechanism (not shown) associated with a non-transitory computer readable storage medium 718, such as a floppy disc, tape, DVD/CD-ROM drive, flash card, memory card, or the like. In some embodiments, software or other digital components may be loaded via the network interface 706, rather than via a computer readable storage medium 718. Special-purpose circuitry 722 may, in some variants, include some or all of the event-sequencing logic described herein. In some embodiments server 700 may include many more components than those shown in FIG. 7, but it is not necessary that all conventional components of a server be shown in order to disclose an illustrative embodiment.

FIG. 8 schematically depicts a diagram of different modules inside a smartphone 800 with an application for a single-action call 114 according to one or more embodiments. If a first user 10 is using an application in a smartphone or similar computer system then in some variants an a stack 801 (e.g. instead of a browser) may use a media module such as a system-in-a-package (SIP) module or equivalent. As shown the stack 800 may also have a call manager 802, interaction manager 803, and application user interface 804 as described above.

FIG. 9 depicts flow diagram for scanning using a session triggering code 208 according to one or more embodiments. In some variants as shown in FIG. 9, a first user 10A can see a QR code 208 in a printed material and use a scanner 901 on the first user's smart phone. Scanning single-action URL code 208 triggers the browser immediately and a call manager 802A inside the browser 902 starts a video call 114. The video call 114 is sent through an internet protocol (IP) or other digital network 950 to the call recipient (e.g. user 10B) using a call manager 802B in a browser or app 904. If a recipient user accepts, then the video call 114 is established through interaction manager 803 as shown.

In a typical implementation a receiver endpoint 962 will not impose a requirement that a session-initiating first endpoint 961 be known and as shown it is anonymous insofar that "single-action" indicates that the video call 114 will be established regardless of prior designation of a particular receiver endpoint 962. In some variants, however, a candidate receiver endpoint 962 may require some information from the first endpoint 961, and such a candidate may require information via one or more prompts 1079 (e.g. on a form to be filled out) to be answered prior to a video call establishment 183 relating to a notification like that of FIG. 10.

FIG. 10 schematically depicts another call 114 as a flow diagram for single-action scanning according to one or more embodiments. After a user takes either option 402 (e.g. allowing a user to initiate a call merely by using an on-screen control 209 with a human-readable label 227 like "VIDEO CALL WITH US") or option 403 (e.g. allowing a user to initiate a call merely by scanning a card or other printed physical item 267 that has a QR code and a human-readable label 227 like "SCAN THIS QR CODE TO VIDEO CALL"), the first endpoint 161, 561, 961 is presented a form having one or more to be filled out (at option 1001 or other structured dialog after which the video call 114 will be established.

Although the algorithm has been described as having step 1001 happening before connecting stage of video call 114, it could be implemented that the video call 114 is established first and then the form is shown to the first endpoint 161, 561, 961. One skilled in the art will recognize that there are other possible combinations of these stages which still express the same essential methodology.

FIG. 11 depicts a particular scenario and progressive data flow 1100 in which one or more improved technologies may be incorporated. Flow 1100 relates two or more client devices 600A-E (see FIG. 6) each operated by a respective user 10 (see FIG. 3) at respective endpoints. These endpoints may communicate either directly or via one or more (routing servers 700 or server components 131-138 in one or more) public networks 1150A such as the Internet as described herein. Alternatively or additionally, these endpoints may likewise communicate via one or more (session control servers 700 or server components 131-138 in one or more) private networks 1150B or other secure connections 204, 304 as described herein.

As shown one or more interpersonal connection criteria 1114 are obtained for some potential connection recipients (e.g. using devices 600B, 600C, and 600E as shown) but not others (e.g. using devices 600A and 600D as shown). Patterns and protocols of such criteria allow an incoming communication to be routed appropriately according to one or more daily availability schedules, topical specialties, or other such suitability-indicative criteria 1114. Alternatively or additionally, updated indicia of real time availability 1116A-B (e.g. indicating a potential recipient user 10 coming online) may be provided at spontaneous times as shown. When a visit 1118 (e.g. by a user of device 600A) to a web site 222 or other online zone 124 occurs, user behaviors are thereby tracked (e.g. by conducting counts of actions 1122A-D, interaction intervals, or other indexes 127, 327 signaling degrees of apparent topical interest) via linkage 1119. This allows one or more assignments 1125A-B (e.g. of indexes or best-matched potential connection recipients. For some best-matched potential connection recipient endpoints 562 (see FIG. 5), in fact more than one device or connection modality may be in effect. This can occur, for example, in a context in which a recipient user may be on call for extended periods and in which connection response time is of the essence.

In various embodiments repeatedly updated assignments 1125 may be based on one or more online user tasks 188 recorded, explicitly expressed or other needs 189 (e.g. manifested in a search term or online section 302 selected), preferences 218 or other indications 220, or other table contents manifesting a user profile. From this profile in response to an actuation 1126 of a user control 209 or similar consequential action, an immediate intent to trigger an interpersonal connection is signaled to special-purpose circuitry 722 residing in private network 1150B as shown, which immediately transmits requests 1127 selectively (e.g. to suitable prospective client endpoints 162, 562, 962 comprising some available devices 600B, 600D but not other available devices 600C, 600E). Immediately in response at least one such device 600B in response signals a receiver-side action 1146 so as to complete at least a bilateral connection 1147 and thereby establish a video chat.

In some variants a single-action call request 1127 is routed to multiple users. This can occur, for example, in a context in which a user 10A calls a sales line of a product or service provider; in which a system 100, 200, 300, 500, 900 is configured to route calls 114 to all qualifying users 10G-H (e.g. in a caller-preferred section 302C) that have indicated they are available to take a call 114 based on one or more caller-specific criteria 1114 as described herein; and in which an incoming call 114 triggers (at least) matched transmitter and receiver endpoints to ring. In some variants whichever qualifying user 10H answers first will receive the call 114. Alternatively or additionally such calls 114 may be directed based on a round-robin protocol or may be based on a time of day (or both). It is also possible to connect a single-action call 114 based on an expressed or inferred language proficiency (e.g., so as to accommodate a calling user 10A who has uttered several phrases matched by recognition component 136 to Spanish language patterns) or location (e.g. manifesting an inferred preference 218 to connect a California-resident caller to a receiving user 10F in Los Angeles) as described herein.

FIG. 12 depicts another scenario and progressive data flow 1200 in which one or more improved technologies may be incorporated. Flow 1200 likewise relates two or more client devices 600A-E (see FIG. 6) each operated by a respective user 10 (see FIG. 3) at respective endpoints. These endpoints may communicate either directly or via one or more (routing servers 700 or server components 131-138 in one or more) public networks 1150A such as the Internet as described herein. Alternatively or additionally, these endpoints may likewise communicate via one or more (session control servers 700 or server components 131-138 in one or more) private networks 1150B or other secure connections 204, 304 as described herein.

As shown one or more interpersonal connection criteria 1214 are obtained for some potential connection recipients (e.g. using devices 600C, 600D, and 600E as shown) but not others (e.g. using device 600B as shown). Patterns and protocols of such criteria allow an incoming communication to be accepted automatically, rejected automatically, or screen with a query to a device user who receives targeted content 330A. (As used herein content is said to be "targeted" if it is directed to at least one recipient in, but less than 75% of, an audience or similar cohort of human beings in a group chat, streamed broadcast audience, or similar online crowd. And the content is said to be "non-targeted" if it is directed to a larger percentage of such a cohort irrespective of a receptivity of some members.) In some contexts such potential content recipients may modify one or more personal content screening criteria 1214 so as to allow some message types (e.g. urgent messages) but not others or to allow incoming content 330A from some message senders (e.g. attorneys, published authors, or other certified individuals) but not others. Alternatively or additionally, a content delivery request recipient may implement one or more personal screening criteria 1214 so as to allow some strangers to approach (e.g. selectively allowing a first- or second-degree-of separation connection, a ranking, or other such a scalar indication 220 of reputation exceeding a threshold) but not others. Alternatively or additionally, updated indicia of real time receptivity (e.g. indicating a potential recipient user 10 becoming receptive to a triaged encounter with a partially qualified individual) may be provided at spontaneous times.

In some contexts a celebrity or other privileged performer may provide live content 1230A (e.g. via one or more devices 600D) that includes auditory message data 321B for use as a livestreamed broadcast 1223 to many recipient devices 600B, 600C, 600E that constitute a live online audience. For a classroom, in some contexts such privileged message content 1230A may likewise be delivered from an authorized instructor to a (virtual breakout room or other) selectively targeted recipient subset.

When a less-privileged user (e.g. of device 600B) transmits content 1230B, in some variants as shown, (one or more recipient-targeting or other operational elements 322A of) such content 1230B may establish context data 1226 signaling what recipient-defining attributes are needed. For an audience member having a medical emergency, for example, there does not need to be any occasion to scream "does anyone here know about _____?" as might have been considered in a real-world conference or ceremony. Rather, an appropriate section 302A may be identified to which one or more lecture audience devices 600C belong, which matching event may be recognized during a recipient assignment 1125C as shown, and in response one or more transmissions of hybrid data 1266A (e.g. simultaneously or otherwise including both a broadcast 1223 and auditory message data 321A corresponding to the one or more context-specifying operational elements 322A into a single auditory channel 117) as shown.

To approach a more selective member of such a cohort successfully, in some contexts it may be necessary to begin with a request 1267 for such a connection. In such contexts an authorization 1257 for the partial intrusion may depend upon an exclusive human user (e.g. of device 600E) receiving convincing elements 322A associated with the auditory message data 321A. When and if such authorization 1257B arrives, hybrid data 1266B may be delivered as shown. This can occur, for example, even when an identity of the second endpoint 162, 562, 962 is not yet resolved as one or more servers 700 implement the communication until after a single receiver-side action 1146 (e.g. answering a call 214 or otherwise accepting the communication by actuating a receiver-side control 209) occurs.

Although the present invention has been described in terms of various embodiments, it is not intended that the invention be limited to these embodiments. Modification within the spirit of the invention will be apparent to those skilled in the art. For example, the connection server 700 may reside in the receiver endpoint 162, 562, 962 or one or more networks 350, 550, 950 that the receiver endpoint 162, 562, 962 is operating on. Also, even though an IP network 950 is specifically mentioned, the same system 100, 200, 300, 500, 900 can operate on an ATM network or other non-IP networks.

Although a "single transmitter-side action" may be preceded by multiple physical movements of a user 10A (e.g., moving a mouse so that a mouse pointer is over a button 206, 406), the single transmitter-side action generally refers to a single event performed at the transmitting endpoint device that indicates the user's inferred intention to allow a video call 114 or similar communication session 314 to be established immediately and without further transmitter-side (user) action.

In light of teachings herein, numerous existing techniques may be applied for configuring special-purpose circuitry or other structures effective for managing auditory communication channels or otherwise enhancing online interpersonal engagement as described herein without undue experimentation. See, e.g., U.S. Pat. No. 10,872,322 ("System and method for collaborative shopping, business and entertainment"); U.S. Pat. No. 10,819,950 ("Altering undesirable communication data for communication sessions"); U.S. Pat. No. 10,791,409 ("Improving a user experience localizing binaural sound to an AR or VR image"); U.S. Pat. No. 10,776,073 ("System and method for managing a mute button setting for a conference call"); U.S. Pat. No. 10,242,032 ("Virtual world system supporting a consumer experience"); U.S. Pat. No. 9,883,042 ("Teleforum participant screening"); U.S. Pat. No. 8,924,482 ("Method and system for policing events within an online community"); U.S. Pat. No. 8,890,919 ("Video conferencing display and method to facilitate enhanced eye contact"); U.S. Pat. No. 8,861,707 ("Method and apparatus for simultaneously monitoring computer user screen and telephone activity from a remote location"). These documents are incorporated herein by reference to the extent not inconsistent herewith.

Also in light of teachings herein, numerous existing techniques may be applied for configuring special-purpose circuitry or other structures effective for compatibility and reputation scoring, single-action response protocols, and other such content and engagement management as described herein without undue experimentation. See, e.g., U.S. Pat. No. 10,182,720 ("System and method for interacting with and analyzing media on a display using eye gaze tracking"); U.S. Pat. No. 10,127,574 ("Internet marketing analytics system"); U.S. Pat. No. 9,904,712 ("Systems, methods, and interfaces for aggregating and providing information regarding legal professionals"); U.S. Pat. No. 9,900,227 ("Analyzing changes in web analytics metrics"); U.S. Pat. No. 8,688,701 ("Ranking and selecting entities based on calculated reputation or influence scores"); U.S. Pat. No. 8,326,964 ("Website data content access progression"); U.S. Pat. No. 7,532,232 ("System and method for single action initiation of a video conference"); U.S. Pub. No. 20190026122 ("Redirecting multimedia output of a virtual desktop to a mobile device using image scanning"); U.S. Pub. No. 20180343135 ("Method of establishing a video call using multiple mobile communication devices"); U.S. Pub. No. 20170300882 ("Videoconferencing with a customer device"); U.S. Pub. No. 20160021207 ("Method and system for a uniform resource identifier (URI) broker"); U.S. Pub. No. 20150324946 ("System and method for embedding of a two dimensional code with an image"); U.S. Pub. No. 20150189227 ("System and method for implementing video calls"); U.S. Pub. No. 20140280490 ("Systems and methods for visual communication"). These documents are incorporated herein by reference to the extent not inconsistent herewith.

Referring again to FIGS. 1-12 above, there are shown various systems 100, 200, 300, 500, 900 in which one or more methods of establishing or otherwise facilitating interpersonal communication (e.g. a video call 114 or other prospective communication session 314 at least) among at least first and second endpoints. In some variants an instance of a control component 131 configure one or more control channels 117 or servers 700 (or both) that host information about the second endpoint 162, 562, 962 including a topical or other non-unique description 401 of the second endpoint (e.g. one or more topical sections 302 or other criteria 1114 pertaining to several eligible second endpoints but not to one or more destinations that are ineligible by virtue of not meeting the non-unique description 401).

An instance of a response component 131 responds to only a single transmitter-side action 1116 at the first endpoint 161, 561, 961 by transmitting a connection request 1126 to establish a (video call channel 117 or other) session connection 204, 304 via the one or more servers 700. Another (instance of a) response component 131 generates or otherwise obtains a network location indication 220 partly based on a connection request 1126 from the first endpoint 161, 561, 961 and partly based on one or more counts 125 or other indexes 127, 327 pertaining to a user 10A of the first endpoint 161, 561, 961 (e.g. signaling how long a user 10A spends in an online zone 124 or other topical section 302). This can occur, for example, in a context in which a notification component 134 designates the second endpoint 162, 562, 962 of the connection request 1126 uniquely and establishing a connection 204, 304 (at least) among the first and second endpoints partly based on the network location indication 220 and partly based on the second endpoint 162, 562, 962; in which the connection request 1126 is obtained as a component of the interpersonal communication that is between first endpoint 161, 561, 961 and the second endpoint 162, 562, 962; in which an interface component 138 could not otherwise obtain a reliable indication of which second endpoint 162, 562, 962 might be most suitable without having to query the user and await a response; and in which an authorization 1257 is received from a third endpoint that authorizes (at least) some targeted auditory message data 321A to be received privately from the second endpoint (e.g. device 600B) at the third endpoint.

Some variants comprise a preference-gleaning method of responding to a user 10A of a first communication device 600A (e.g. identified by a username, phone number, IMEI number, account number, or IP address), the method including obtaining an availability commencement signal from each of multiple resources 290 including first and second resources 202A-B, wherein the first resource 202A is associated (by a first record 316A at least) with a first subject identifier 326 and wherein the second resource 202B is associated (by a second record 316B at least) with a second subject identifier 326. The method also includes obtaining a first interactive volume index 127, 327 (e.g. as a function 313 of seconds or megabytes during a current session 314 or time interval 315) between the (user 10A of the) first communication device 600A and (content 229, 330 associated (by one or more records 116, 316 at least) with) the first subject identifier 318. The method also includes obtaining a second interactive volume index 227, 327 (e.g. as a function 313 of seconds or megabytes during a current session 314 or time interval 315) between the (user 10A of the) first communication device 600A and (content 330B associated by one or more records 116, 316 at least with) the second subject identifier 326. The method also includes "directly" responding to an (activation of a single control 209 or articulation or gesture or other) intentional activation signal (by the user 10A on or otherwise) via the first communication device 600A by establishing an "immediate" (videoconference or other) connection 204, 304 between the first communication device 600A and the first resource 202A associated with a first subject identifier 326 partly based on (a screen display 612 of) the first communication device 600A not recently (i.e. at the time of the activation selectively presenting or within 30 seconds or otherwise) having been selectively connected to the content 330B associated with the second subject identifier 326 and partly based on the first interactive volume index 127, 327 (e.g. as a function 313 of seconds or megabytes during a current session 314 or time interval 315) between the (user 10A of the) first communication device 600A and (content 330A associated (by one or more records 116, 316 at least) with) the first subject identifier 326 exceeding a threshold (associated with or otherwise) corresponding to the second interactive volume index 227, 327 (e.g. as a function 313 of seconds or megabytes during a current session 314 or time interval 315) between the (user 10A of the) first communication device 600A and (content 330B associated (by one or more records 116, 316 at least) with) the second subject identifier 326. This can occur, for example, in a context in which the system 100, 200, 300, 500, 900 would otherwise be unable to establish any such "immediate" connection 204, 304 without first having to wait for the user 10A to (explicitly identify or otherwise selectively) express a primary (preference 218, ranking 219, or other hierarchical indication 220 of apparent) interest in the (content 230 of the) first subject identifier 226, 326 or a degree of disinterest in the (object of the) second subject identifier 226, 326.

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES 1. (Independent) A method of establishing, configuring, or otherwise facilitating interpersonal communication (e.g. a video call 114 or other prospective communication session 314 at least) among at least a first endpoint 161, 561, 961 and a second endpoint 162, 562, 962, the method comprising:

invoking transistor-based circuitry (e.g. an instance of a control component 131) configured to cause a control channel 117 and one or more servers 700 that host information about the second endpoint 162, 562, 962 including a (topical or other) non-unique description 401 of the second endpoint 162, 562, 962 (e.g. one or more topical sections 302 or other criteria 1114 pertaining to eligible second endpoints 162, 562, 962 but not to one or more destinations that are ineligible by virtue of not meeting the description 401);

invoking transistor-based circuitry (e.g. one or more response components 132) configured to respond to a single transmitter-side action 1122D at the first endpoint 161, 561, 961 by transmitting a connection request 1127 to establish a (video call channel 117 or other) session connection 204, 304 via the one or more servers 700;

invoking transistor-based circuitry (e.g. an instance of a routing component 133) configured to obtain a network location indication 220 partly based on the connection request 1127 from the first endpoint 161, 561, 961 and partly based on one or more indexes 228, 328 pertaining to a user 10A of the first endpoint 161, 561, 961 indicating the non-unique description 401; and invoking transistor-based circuitry (e.g. an instance of a notification component 134) configured to notify the second endpoint 162, 562, 962 of the connection request 1127 and establishing a connection 204, 304 (between or otherwise) among the first and second endpoints partly based on the network location indication 220 and partly based on the second endpoint 162, 562, 962 granting the connection request 1127 as a component of the interpersonal communication.

2. The method of Clause 1 comprising:

obtaining (a default or other) authorization 1257 from (at least one user 10D of) a third endpoint that authorizes (at least) some targeted auditory message data 321A to be received privately from the second endpoint at the third endpoint;

obtaining (broadcast, ambient musical, lecture, or other) second auditory message data 321B from a device 600D of a fourth endpoint at least to a device 600C of the third endpoint;

causing a communication device 600C of the third endpoint to present (at least) the targeted auditory message data 321A from the second endpoint and the auditory message data 321B from the fourth endpoint so as to attenuate or otherwise demote the auditory message data 321B from the fourth endpoint relative to the targeted auditory message data 321A from the second endpoint (at least partly) based on the third endpoint authorizing the targeted auditory message data 321A to be received privately from the second endpoint.

3. The method of Clause 2 wherein at least one communication device 600C of the third endpoint handles targeted auditory message data 321A from the second endpoint and auditory message data 321B from a fourth endpoint so as to demote the auditory message data 321B from the fourth endpoint relative to the targeted auditory message data 321A from the second endpoint (at least) by delaying the auditory message data 321B from the fourth endpoint more than the targeted auditory message data 321A from the second endpoint by more than one second.

4. The method of Clause 2 or Clause 3 wherein causing a communication device 600C of the third endpoint to present targeted auditory message data 321A from the second endpoint and auditory message data 321B from a fourth endpoint simultaneously (is included and) comprises:

causing the communication device 600C of the third endpoint to present (at least) the targeted auditory message data 321A from the second endpoint partly based on the third endpoint authorizing the targeted auditory message data 321A to be received (at least) privately from the second endpoint and partly based on a metadata element 322A pertaining to the targeted auditory message data 321A matching one or more limiting attributes (e.g. of a shared section 302A comprising one or more common interests, language fluencies, or other such criteria 1114).

5. (Independent) A method of establishing, configuring, or otherwise facilitating interpersonal communication between at least or otherwise among at least a first endpoint 161, 561, 961 and a second endpoint 162, 562, 962, the method comprising:

invoking transistor-based circuitry (e.g. one or more authorization components 137) configured to obtain (default or other) authorization 1257 from (at least one user 10B-C of) the second endpoint 162, 562, 962 that (selectively or otherwise) authorizes (at least) some targeted auditory message data 321A to be received (at least selectively) from the first endpoint 161, 561, 961 at the second endpoint 162, 562, 962; and invoking transistor-based circuitry (e.g. an instance of routing component 133) configured to obtain a broadcast or other additional auditory message data 321B from a third endpoint at least to the second endpoint 162, 562, 962;

invoking transistor-based circuitry (e.g. one or more interface components 138) configured to cause a communication device 600 of the second endpoint 162, 562, 962 to present (at least) the targeted auditory message data 321A from the first endpoint 161, 561, 961 and the auditory message data 321B from the third endpoint so as to (delay, attenuate, or otherwise partially) demote the auditory message data 321B from the third endpoint relative to the targeted auditory message data 321A from the first endpoint 161, 561, 961 (at least partly) based on the second endpoint 162, 562, 962 authorizing the targeted auditory message data 321A to be received (at least selectively) from the first endpoint 161, 561, 961.

6. The method of ANY of the above method clauses wherein a first one of one or more selection criteria 1114 used in establishing a connection 204, 304 to the second endpoint 162, 562, 962 selectively (at least partly) based on a time of day but excludes a connection 204, 304 to the second endpoint 162, 562, 962 at other times of day.

7. The method of ANY of the above method clauses wherein another endpoint declines a connection request and wherein a control channel 117 continues a connection attempt to one or more other receiver endpoints in response until the second endpoint 162, 562, 962 is found that accepts the connection request.

8. The method of ANY of the above method clauses wherein a first one of one or more selection criteria 1114 used in establishing a connection 204, 304 to the second endpoint 162, 562, 962 selectively is (at least partly) based on a language indication 220 but excludes a connection 204, 304 to a second endpoint 162, 562, 962 based on the language indication 220.

9. The method of ANY of the above method clauses wherein a particular one of one or more selection criteria 1114 to a select a particular second endpoint 162, 562, 962 in a round robin fashion (e.g. by favoring user 10H because other eligible users 10C-G were connected more recently than user 10H).

10. The method of ANY of the above method clauses wherein a single transmitter-side action communication (e.g. a call 114 or other prospective session 314) is established by touching a smartphone screen.

11. The method of ANY of the above method clauses wherein a single transmitter-side action communication (e.g. a call 114 or other prospective session 314) is initiated using an utterance or other user-provided sound.

12. The method of ANY of the above method clauses wherein the second endpoint 162, 562, 962 requires the first endpoint 161, 561, 961 to identify itself before accepting the communication (e.g. a call 114 or other prospective session 314).

13. The method of ANY of the above method clauses wherein a system 100, 200, 300, 500, 900 thereof is configured so that a single transmitter-side action communication (e.g. a call 114 or other prospective session 314) will be initiated by a user having clicked on a mouse button 206 when it points to a particular URL (e.g. as an identifier 226 of one or more sections 302 or other resources 202) of a web site 222.

14. The method of ANY of the above method clauses wherein a single transmitter-side action communication (e.g. a call 114 or other prospective session 314) is configured to be initiated by a scanner 901 scanning a QR code 208.

15. The method of ANY of the above method clauses wherein a single transmitter-side action communication (e.g. a call 114 or other prospective session 314) is configured to be initiated by someone having clicked on a mouse button 206 when it points to a particular URL (e.g. as an identifier 226 of one or more sections 302 or other resources 202) in an email 263.

16. The method of ANY of the above method clauses wherein a call 114 is allowed only if a count 125 of how many calls from a particular web site 222 is below a predetermined threshold.

17. The method of ANY of the above method clauses wherein targeted auditory message data 321A is detected via at least a first sensor (e.g. a microphone as user input 608) at the first endpoint 161, 561, 961 and streamed from the first endpoint 161, 561, 961 to the second endpoint 162, 562, 962 so that a presentation of the targeted auditory message data 321A begins at the second endpoint 162, 562, 962 before a conclusion of the targeted auditory message data 321A has been captured via at least the first sensor at the first endpoint 161, 561, 961.

18. The method of ANY of the above method clauses wherein a click of a mouse button 206 triggers the interpersonal communication (e.g. a call 114 or other prospective session 314) only during certain time of the day and wherein such a click at other times of the day will not trigger any interpersonal communication.

19. The method of ANY of the above method clauses wherein a timer or other counter having a count 125 that starts when the communication (e.g. a call 114 or other prospective session 314) is established and wherein the call 114 is terminated when it reaches a count threshold.

20. The method of ANY of the above method clauses wherein a single transmitter-side action communication (e.g. a call 114 or other prospective session 314) is established only if it is as a result of clicking on a mouse button on a web site 222.

21. The method of ANY of the above method clauses wherein a second endpoint 162, 562, 962 and first endpoint 161, 561, 961 thereof use different control protocols.

22. The method of ANY of the above method clauses wherein a second endpoint 162, 562, 962 thereof is using Session Initiation Protocol and a first endpoint 161, 561, 961 thereof is using WebRTC protocol to establish the interpersonal communication.

23. The method of ANY of the above method clauses wherein the control channel 117 establishes an interpersonal communication (e.g. a call 114 or other prospective session 314) and terminates the communication (e.g. a call 114 or other prospective session 314).

24. The method of ANY of the above method clauses wherein a receiver endpoint 532 thereof comprises a (smartphone or other) computing device 600 that includes at least a first microphone and first camera.

25. The method of ANY of the above method clauses wherein no unique identifier 226 of a user 10 of the second endpoint 162, 562, 962 is known to the first endpoint 161, 561, 961 when the connection request 1127 is transmitted.

26. The method of ANY of the above method clauses wherein a first endpoint 161, 561, 961 thereof comprises a (smartphone or other) computing device 600 that includes at least a first microphone and first camera.

27. The method of ANY of the above method clauses wherein no unique identifier 226 of the second endpoint 162, 562, 962 is known to the first endpoint 161, 561, 961 when the connection request 1127 is transmitted.

28. The method of ANY of the above method clauses comprising:

receiving the connection request 1127 under control of a single-action communication authorization component 137 of the one or more servers 700.

29. The method of ANY of the above method clauses wherein a description 401 of the second endpoint 162, 562, 962 does not uniquely identify the second endpoint 162, 562, 962 to the first endpoint 161, 561, 961 (at least) until after the connection request 1127 is transmitted.

30. The method of ANY of the above method clauses wherein a description 401 of the second endpoint 162, 562, 962 does not uniquely identify the second endpoint 162, 562, 962 to the first endpoint 161, 561, 961 so that the second endpoint 162, 562, 962 remains anonymous throughout the interpersonal communication.

31. The method of ANY of the above method clauses wherein an identity of the second endpoint 162, 562, 962 is not yet known to a control channel 117 that connects the endpoints when a single receiver-side action 1146 that authorizes the interpersonal communication occurs at the second endpoint 162, 562, 962.

32. The method of ANY of the above method clauses wherein an identity of the second endpoint 162, 562, 962 is not yet resolved at one or more servers 700 implementing the communication until after a single receiver-side action 1146 (e.g. answering a call 114 or otherwise signaling a specific intent to start an immediate interpersonal communication, such as by actuating a control 209) occurs.

33. The method of ANY of the above method clauses comprising:

configuring one or more records 216 so as to associate one or more topical identifiers 226 or other such connection criteria 1114 with each of several (prospective candidate) receiving endpoints; and retrieving at least a network location indication 220 specifically pertaining to the second endpoint 162, 562, 962 from the one or more network location records 216 in response to a connection request 1127 from the first endpoint 161, 561, 961 wherein the second endpoint 162, 562, 962 is one of the several receiving endpoints.

34. The method of ANY of the above method clauses wherein an element 322A of the interpersonal communication comprises an uttered recipient designation (e.g. identifying a user of the second endpoint 162, 562, 962) that is part of a connection request 1127 presented to (at least one user 10B-C of) the second endpoint 162, 562, 962 before the auditory message data 321A is transmitted to the second endpoint 162, 562, 962.

35. The method of ANY of the above method clauses wherein an element 322A of the interpersonal communication comprises a (section identifier 226 or other) topic designation that is part of a connection request 1127 presented to at least (one user 10B-C of) the second endpoint 162, 562, 962 before auditory message data 321A is transmitted from the first endpoint 161, 561, 961 to the second endpoint 162, 562, 962.

36. The method of ANY of the above method clauses wherein an element 322A of the interpersonal communication comprises an urgency designation that is part of a connection request 1227 presented to (at least one user 10B-C of) the second endpoint 162, 562, 962 before auditory message data 321A is transmitted from the first endpoint 161, 561, 961 to the second endpoint 162, 562, 962.

37. The method of ANY of the above method clauses wherein an element 322A of the interpersonal communication comprises an urgency designation that is part of a connection request 1227 presented to (at least one user 10B-C of) the second endpoint 162, 562, 962 before an authorization 1257 is obtained from the second endpoint 162, 562, 962.

38. The method of ANY of the above method clauses wherein an element 322A of the interpersonal communication comprises a topic designation that is part of a connection request 1227 presented to (at least one user 10B-C of) the second endpoint 162, 562, 962 before an authorization 1257 is obtained from the second endpoint 162, 562, 962.

39. The method of ANY of the above method clauses wherein an element 322A of the interpersonal communication comprises an (individual, corporate, or other) uttered recipient identifier 226 that is part of a connection request 1227 presented to (at least one user 10B-C of) the second endpoint 162, 562, 962 before an authorization 1257 permits any targeted auditory message data 321A to be received from the first endpoint 161, 561, 961 at the second endpoint 162, 562, 962.

40. The method of ANY of the above method clauses wherein an element 322A of the interpersonal communication comprises an (individual, corporate, or other) uttered recipient identifier 226 that is part of a connection request 1227 presented to (at least one user 10B-C of) the second endpoint 162, 562, 962 before an authorization 1257 permits any targeted auditory message data 321A from the first endpoint 161, 561, 961 to be presented at the second endpoint 162, 562, 962.

41. The method of ANY of the above method clauses wherein the one or more metadata elements 322A pertaining to targeted auditory message data 321A include at least a first reputation indication 220 that describes a user 10A of the first endpoint 161, 561, 961 whereby the targeted auditory message data 321A as a component of the interpersonal communication is selectively and automatically authorized before the targeted auditory message data 321A.

42. The method of ANY of the above method clauses wherein at least one communication device 600 of the second endpoint 162, 562, 962 handles targeted auditory message data 321A from the first endpoint 161, 561, 961 and auditory message data 321B from a third endpoint so as to attenuate or otherwise partially demote the auditory message data 321B from the third endpoint.

43. The method of ANY of the above method clauses wherein at least one communication device 600 of the second endpoint 162, 562, 962 handles targeted auditory message data 321A from the first endpoint 161, 561, 961 and auditory message data 321B from a third endpoint so as to attenuate or otherwise partially demote the auditory message data 321B from the third endpoint relative to the targeted auditory message data 321A from the first endpoint 161, 561, 961.

44. The method of ANY of the above method clauses wherein at least one communication device 600 of the second endpoint 162, 562, 962 handles targeted auditory message data 321A from the first endpoint 161, 561, 961 and auditory message data 321B from a third endpoint so as to demote the auditory message data 321B from the third endpoint relative to the targeted auditory message data 321A from the first endpoint 161, 561, 961 by delaying the auditory message data 321B from the third endpoint more than the targeted auditory message data 321A from the first endpoint 161, 561, 961.

45. The method of ANY of the above method clauses wherein at least one communication device 600 of the second endpoint 162, 562, 962 handles targeted auditory message data 321A from the first endpoint 161, 561, 961 and auditory message data 321B from a third endpoint so as to demote the auditory message data 321B from the third endpoint relative to the targeted auditory message data 321A from the first endpoint 161, 561, 961 (at least) by delaying the auditory message data 321B from the third endpoint more than the targeted auditory message data 321A from the first endpoint 161, 561, 961 by more than one second.

46. The method of ANY of the above method clauses wherein causing a communication device 600 of the second endpoint 162, 562, 962 to present targeted auditory message data 321A from the first endpoint 161, 561, 961 and auditory message data 321B from a third endpoint (is included and) comprises:

causing the communication device 600 of the second endpoint 162, 562, 962 to present (at least) the targeted auditory message data 321A from the first endpoint 161, 561, 961 partly based on the second endpoint 162, 562, 962 authorizing the targeted auditory message data 321A to be received (at least selectively) from the first endpoint 161, 561, 961 and partly based on a metadata element 322A pertaining to the targeted auditory message data 321A matching one or more limiting attributes (e.g. of a shared section 302A comprising one or more common interests, language fluencies, or other such criteria 1114).

47. The method of ANY of the above method clauses wherein causing a communication device 600 of the second endpoint 162, 562, 962 to present targeted auditory message data 321A from the first endpoint 161, 561, 961 and auditory message data 321B from a third endpoint simultaneously (is included and) comprises:

causing the communication device 600 of the second endpoint 162, 562, 962 to present (at least) the targeted auditory message data 321A from the first endpoint 161, 561, 961 partly based on the second endpoint 162, 562, 962 authorizing the targeted auditory message data 321A to be received (at least selectively) from the first endpoint 161, 561, 961 and partly based on a message language identifier 227 (e.g. as a metadata element 322A pertaining to the targeted auditory message data 321A) matching one or more natural languages that a recipient user 10B has previously identified (e.g. as a section 302A or otherwise as having a fluency).

48. The method of ANY of the above method clauses wherein (users 10A-B of) the first and second endpoints share a (teleconference, virtual reality environment, or other) section 302A in common with (users 10C-E of at least) third and fourth endpoints and wherein targeted auditory message data 321A from the first endpoint 161, 561, 961 is delivered "privately" to the second endpoint 162, 562, 962 insofar that at least the third and fourth endpoints never receive it.

49. The method of ANY of the above method clauses wherein (users 10A-B of) the first and second endpoints share a (breakout room or other meeting) section 302A in common with third and fourth endpoints and wherein targeted auditory message data 321A from the first endpoint 161, 561, 961 is delivered "privately" to the second endpoint 162, 562, 962 insofar that at least the third and fourth endpoints never receive it and wherein auditory message data 321B from the third endpoint (e.g. in use by a lecturer, witness, or other primary speaker) is simultaneously received by an audience comprising the first, second, and fourth endpoints.

50. The method of ANY of the above method clauses wherein (users 10A-B of) the first and second endpoints share a (teleconference, virtual reality environment, or other) section 302A in common with third and fourth endpoints and wherein targeted auditory message data 321A from the first endpoint 161, 561, 961 is delivered "privately" to the second endpoint 162, 562, 962 insofar that at least the third and fourth endpoints never receive it and wherein livestreamed auditory message data 321B from the third endpoint is received (nominally) simultaneously by a live audience comprising (respective users 10 of) the first, second, and fourth endpoints.

51. The method of ANY of the above method clauses wherein (users 10A-B of) the first and second endpoints share a (teleconference, virtual reality environment, or other) section 302A in common with (users 10C-E of at least) third and fourth endpoints and wherein targeted auditory message data 321A from the first endpoint 161, 561, 961 is delivered "privately" to the second endpoint 162, 562, 962 insofar that at least the third endpoint never receives it and wherein auditory message data 321B from the third endpoint (e.g. in use by a lecturer, witness, or other primary speaker) is received by the first, second, and fourth endpoints (e.g. as a.

52. The method of ANY of the above method clauses wherein at least one communication device 600 of the second endpoint 162, 562, 962 plays via at least a first speaker 611 of (a device 600 of) the second endpoint 162, 562, 962 targeted auditory message data 321A from the first endpoint 161, 561, 961 and the auditory message data 321B from a third endpoint (e.g. an instance of device 600 operated by user 10H).

53. The method of ANY of the above method clauses wherein at least one communication device 600 of the second endpoint 162, 562, 962 presents via at least a first speaker 611 of (a device 600 of) the second endpoint 162, 562, 962 targeted auditory message data 321A from the first endpoint 161, 561, 961 and the auditory message data 321B from a third endpoint simultaneously.

54. The method of ANY of the above method clauses wherein at least one communication device 600 of the second endpoint 162, 562, 962 presents via at least a first speaker 611 of the second endpoint 162, 562, 962 targeted auditory message data 321A from the first endpoint 161, 561, 961 and the auditory message data 321B from a third endpoint simultaneously with the auditory message data 321B from the third endpoint temporarily softened (e.g. by more than 1 decibel for more than one second so as to make the targeted auditory message data 321A easier for the recipient to hear).

55. The method of ANY of the above method clauses wherein at least one communication device 600 of the second endpoint 162, 562, 962 presents via at least a first speaker 611 of the second endpoint 162, 562, 962 targeted auditory message data 321A from the first endpoint 161, 561, 961 and the auditory message data 321B from a third endpoint so as to demote the auditory message data 321B from the third endpoint partially by delaying the auditory message data 321B from the third endpoint until after most of the targeted auditory message data 321A has been presented based on the second endpoint 162, 562, 962 authorizing the targeted auditory message data 321A to be received privately from the first endpoint 161, 561, 961 and partly based on one or more metadata elements 322A pertaining to a reputation of a sender (e.g. user 10A) of the targeted auditory message data 321A.

56. The method of ANY of the above method clauses comprising:

demoting auditory message data 321B from a third endpoint relative to targeted auditory message data 321A from the first endpoint 161, 561, 961 partly based on the second endpoint 162, 562, 962 authorizing the targeted auditory message data 321A to be received (at least selectively) from the first endpoint 161, 561, 961 and partly based on one or more metadata elements 322A pertaining to a reputation of a sender of the targeted auditory message data 321A.

57. The method of ANY of the above method clauses wherein at least one communication device 600 of the second endpoint 162, 562, 962 presents via at least a first speaker 611 of the second endpoint 162, 562, 962 targeted auditory message data 321A from the first endpoint 161, 561, 961 and the auditory message data 321B from a third endpoint so as to (delay, attenuate, or otherwise partially) demote the auditory message data 321B from the third endpoint relative to the targeted auditory message data 321A from the first endpoint 161, 561, 961 partly based on the second endpoint 162, 562, 962 authorizing the targeted auditory message data 321A to be received (at least selectively) from the first endpoint 161, 561, 961 and partly based on one or more metadata elements 322A pertaining to a reputation of a sender (e.g. user 10A) of the targeted auditory message data 321A.

58. The method of ANY of the above method clauses wherein one or more metadata elements 322A pertaining to targeted auditory message data 321A include a crowd-sourced indication 220 that describes a user 10A of the first endpoint 161, 561, 961 whereby the communication is automatically authorized.

59. The method of ANY of the above method clauses wherein one or more metadata elements 322A pertaining to targeted auditory message data 321A include a high-enough reputation indication 220 (e.g. exceeding a threshold specified by the recipient user 10A of the first endpoint 161, 561, 961) that describes a user 10A of the first endpoint 161, 561, 961 whereby the communication is automatically authorized.

60. The method of ANY of the above method clauses wherein one or more metadata elements 322A pertaining to targeted auditory message data 321A include a recipient-specified reputation indication 220 that describes a user 10A of the first endpoint 161, 561, 961 whereby the communication is automatically authorized.

61. The method of ANY of the above method clauses wherein one or more metadata elements 322A pertaining to targeted auditory message data 321A include a ranking 219 that describes a user 10A of the first endpoint 161, 561, 961 whereby the communication is automatically authorized.

62. The method of ANY of the above method clauses wherein a first second endpoint 162, 562, 962 receives an incoming communication (e.g. a call 114 or other prospective session 314) and an other endpoint does not receive the incoming communication (at least partly) based on one or more matching criteria 1114 that include a prospective receiving user 10F (indicated by one or more records 216 as) being able to communicate in a specified natural language designated for use with a requesting user 10A.

63. The method of ANY of the above method clauses wherein a (prospective) first second endpoint 162, 562, 962 receives an incoming communication (e.g. a call 114 or other prospective session 314) and an other endpoint does not receive the incoming communication (at least partly) based on one or more matching criteria 1114 that include the second endpoint 162, 562, 962 (apparently) being in a regional or other geographical proximity (e.g. identified by a place name or distance therebetween) with a requesting user 10A and the second endpoint 162, 562, 962 not being in the geographical proximity with a requesting user 10A.

64. The method of ANY of the above method clauses wherein the second endpoint 162, 562, 962 receives an incoming communication (e.g. a call 114 or other prospective session 314) and an other endpoint does not receive the incoming communication (at least partly) based on one or more matching criteria 1114 that include a section 302B to which the second endpoint 162, 562, 962 has been selectively assigned being associated with a specified natural language (e.g. with a label 227 of "Spanish" or "Español") designated for use with a requesting user 10A and to which the other endpoint has not been selectively assigned.

65. The method of ANY of the above method clauses wherein a first second endpoint 162, 562, 962 receives an incoming communication (e.g. a call 114 or other prospective session 314) and an other endpoint does not receive the incoming communication (at least partly) based on one or more matching criteria 1114 that include a section 302B to which the first second endpoint 162, 562, 962 has been selectively assigned being associated with a regional or other geographical proximity (e.g. identified by a place name or coordinate range) associated with a requesting user 10A and to which the other endpoint has not been selectively associated.

66. (Independent) A system 100, 200, 300, 500, 900 of facilitating interpersonal communication (e.g. a video call 114 or other prospective communication session 314 at least) among at least a first endpoint 161, 561, 961 and a second endpoint 162, 562, 962, the method comprising:

transistor-based circuitry configured to cause a control channel 117 and one or more servers 700 that host information about the second endpoint 162, 562, 962 including a (topical or other) non-unique description 401 of the second endpoint 162, 562, 962 (e.g. one or more topical sections 302 or other criteria 1114 pertaining to eligible second endpoints 162, 562, 962 but not to one or more destinations that are ineligible by virtue of not meeting the description 401);

transistor-based circuitry configured to respond to a single transmitter-side action 1116 at the first endpoint 161, 561, 961 by transmitting a connection request 1127 to establish a (video call channel 117 or other) session connection 204, 304 via the one or more servers 700;

transistor-based circuitry configured to obtain a network location indication 220 partly based on the connection request 1127 from the first endpoint 161, 561, 961 and partly based on one or more indexes 228, 328 pertaining to a user 10A of the first endpoint 161, 561, 961 indicating the non-unique description 401; and transistor-based circuitry configured to notify the second endpoint 162, 562, 962 of the connection request 1127 and establishing a connection 204, 304 (at least) among the first and second endpoints partly based on the network location indication 220 and partly based on the second endpoint 162, 562, 962 granting the connection request 1127 as a component of the interpersonal communication.

67. (Independent) A system 100, 200, 300, 500, 900 of facilitating interpersonal communication between at least or otherwise among at least a first endpoint 161, 561, 961 and a second endpoint 162, 562, 962, the method comprising:

transistor-based circuitry configured to obtain (default or other) authorization 1257 from (at least one user 10B-C of) the second endpoint 162, 562, 962 that (selectively or otherwise) authorizes (at least) some targeted auditory message data 321A to be received (at least selectively) from the first endpoint 161, 561, 961 at the second endpoint 162, 562, 962; and transistor-based circuitry configured to obtain a second (targeted or other) auditory message data 321B from a third endpoint at least to the second endpoint 162, 562, 962; and transistor-based circuitry configured to cause a communication device 600 of the second endpoint 162, 562, 962 to present (at least) the targeted auditory message data 321A from the first endpoint 161, 561, 961 and the auditory message data 321B from the third endpoint so as to (delay, attenuate, or otherwise partially) demote the auditory message data 321B from the third endpoint relative to the targeted auditory message data 321A from the first endpoint 161, 561, 961 (at least partly) based on the second endpoint 162, 562, 962 authorizing the targeted auditory message data 321A to be received (at least selectively) from the first endpoint 161, 561, 961.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

What is claimed is:

1. A method of configuring an interpersonal video call among at least a first endpoint and a second endpoint, said method comprising:

invoking transistor-based circuitry configured to obtain a receiver description from said first endpoint wherein said receiver description is associated with each of several prospective receiving endpoints by one or more records;

invoking transistor-based circuitry configured to respond to a first authorization wherein said first authorization allows at least some targeted auditory message data to be received selectively and privately from said first endpoint at said second endpoint;

invoking transistor-based circuitry configured to obtain additional auditory message data from a third endpoint at least to said second endpoint; and invoking transistor-based circuitry configured to cause a communication device of said second endpoint to present said targeted auditory message data from said first endpoint and said additional auditory message data from said third endpoint so as to attenuate said additional auditory message data from said third endpoint relative to said targeted auditory message data from said first endpoint partly based on said second endpoint authorizing said targeted auditory message data to be received selectively and privately from said first endpoint and partly based on one or more metadata elements pertaining to said targeted auditory message data, wherein causing said communication device of said second endpoint to present said targeted auditory message data from said first endpoint and said additional auditory message data from said third endpoint simultaneously comprises:

causing said communication device of said second endpoint to present said targeted auditory message data from said first endpoint partly based on said second endpoint authorizing said targeted auditory message data to be received selectively and privately from said first endpoint and partly based on a message language identifier matching one or more natural languages that a recipient user has previously identified.

2. The method of claim 1 wherein said targeted auditory message data is received selectively and privately insofar that a fourth endpoint in communication with said second and third endpoints does not receive any auditory message data from said first endpoint.

3. The method of claim 1 wherein obtain said non-targeted additional auditory message data from said third endpoint at least to said second endpoint comprises:

obtaining at least one of music, a broadcast, or a public presentation as said non-targeted additional auditory message data from said third endpoint at least to said second endpoint.

4. The method of claim 1 wherein at least said first and second endpoints use different control protocols and wherein a control channel establishes said interpersonal video call so as to accommodate said different control protocols.

5. The method of claim 1 wherein an identity of said second endpoint is not yet resolved at one or more servers implementing said interpersonal video call until after a single receiver-side action accepting said interpersonal video call occurs.

6. The method of claim 1 wherein an element of said interpersonal video call comprises a topic designation that is part of a connection request presented to said second endpoint before said targeted auditory message data is transmitted from said first endpoint to said second endpoint.

7. The method of claim 1 wherein an element of said interpersonal video call comprises a topic designation that is part of a connection request presented to said second endpoint before said authorization is obtained from said second endpoint.

8. The method of claim 1 wherein an element of said interpersonal video call comprises an uttered recipient identifier that is part of a connection request presented to said second endpoint before said authorization permits any targeted auditory message data from said first endpoint to be presented at said second endpoint.

9. The method of claim 1 wherein obtaining said receiver description from said first endpoint comprises:

retrieving at least a network location indication specifically pertaining to said second endpoint from one or more network location records in response to a connection request from said first endpoint.

10. A method of configuring an interpersonal video call among at least a first endpoint and a second endpoint, said method comprising:

invoking transistor-based circuitry configured to obtain a receiver description from said first endpoint wherein said receiver description is associated with each of several prospective receiving endpoints by one or more records;

invoking transistor-based circuitry configured to respond to a first authorization wherein said first authorization allows at least some targeted auditory message data to be received selectively and privately from said first endpoint at said second endpoint;

invoking transistor-based circuitry configured to obtain additional auditory message data from a third endpoint at least to said second endpoint; and invoking transistor-based circuitry configured to cause a communication device of said second endpoint to present said targeted auditory message data from said first endpoint and said additional auditory message data from said third endpoint so as to attenuate said additional auditory message data from said third endpoint relative to said targeted auditory message data from said first endpoint partly based on said second endpoint authorizing said targeted auditory message data to be received selectively and privately from said first endpoint and partly based on one or more metadata elements pertaining to said targeted auditory message data, wherein causing said communication device of said second endpoint to present said targeted auditory message data from said first endpoint and said additional auditory message data from said third endpoint simultaneously comprises:

attenuating said additional auditory message data from said third endpoint by more than 1 decibel during a presentation of said targeted auditory message data from said first endpoint wherein said presentation of said targeted auditory message data from said first endpoint lasts less than one minute and wherein said targeted auditory message data from said first endpoint is presented simultaneously without attenuation.

11. The method of claim 10 wherein said targeted auditory message data is received selectively and privately insofar that a fourth endpoint that receives said non-targeted additional auditory message data from said third endpoint does not get any opportunity to receive said targeted auditory message data.

12. The method of claim 10 wherein a description of said second endpoint does not uniquely identify said second endpoint to said first endpoint until after said connection request is transmitted and wherein a final determination of an identity of said second endpoint is not yet known when a single receiver-side action that authorizes said interpersonal video call occurs at said second endpoint.

13. The method of claim 10 wherein said targeted auditory message data is detected via at least a first sensor at said first endpoint and streamed from said first endpoint to said second endpoint so that a presentation of said targeted auditory message data begins at said second endpoint before a conclusion of said targeted auditory message data has been captured via at least said first sensor at said first endpoint.

14. The method of claim 10 wherein an element of said interpersonal video call comprises an urgency designation that is part of a connection request presented to said second endpoint before said authorization is obtained from said second endpoint.

15. The method of claim 10 wherein an element of said interpersonal video call comprises an uttered recipient identifier that is part of a connection request presented to said second endpoint before said authorization permits any targeted auditory message data to be received from said first endpoint at said second endpoint.

16. The method of claim 10 wherein said one or more metadata elements pertaining to said targeted auditory message data include at least a first reputation indication that describes a user of said first endpoint whereby said targeted auditory message data from said first endpoint as a component of said interpersonal communication is selectively and automatically authorized before said first endpoint transmits said targeted auditory message data.

17. A system of configuring an interpersonal video call among at least a first endpoint and a second endpoint, said system comprising:

transistor-based circuitry configured to obtain a receiver description from said first endpoint wherein said receiver description is associated with each of several prospective receiving endpoints by one or more records;

transistor-based circuitry configured to respond to a first authorization wherein said first authorization allows at least some targeted auditory message data to be received selectively and privately from said first endpoint at said second endpoint;

transistor-based circuitry configured to obtain additional auditory message data from a third endpoint at least to said second endpoint; and transistor-based circuitry configured to cause a communication device of said second endpoint to present said targeted auditory message data from said first endpoint and said additional auditory message data from said third endpoint so as to attenuate said additional auditory message data from said third endpoint relative to said targeted auditory message data from said first endpoint partly based on said second endpoint authorizing said targeted auditory message data to be received selectively and privately from said first endpoint and partly based on one or more metadata elements pertaining to said targeted auditory message data, wherein causing said communication device of said second endpoint to present said targeted auditory message data from said first endpoint and said additional auditory message data from said third endpoint simultaneously comprises: causing said communication device of said second endpoint to present said targeted auditory message data from said first endpoint partly based on said second endpoint authorizing said targeted auditory message data to be received selectively and privately from said first endpoint and partly based on a message language identifier matching one or more natural languages that a recipient user has previously identified.

18. The system of claim 17, further comprising:
said communication device of said second endpoint.

* * * * *